(12) United States Patent
Peck et al.

(10) Patent No.: US 11,345,119 B2
(45) Date of Patent: May 31, 2022

(54) METHODS OF FORMING LAMINATES

(71) Applicant: The Procter & Gamble Company, Cincinnati, OH (US)

(72) Inventors: Daniel Charles Peck, Mason, OH (US); John Brian Strube, Okeana, OH (US); Matthew William Waldron, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 42 days.

(21) Appl. No.: 17/123,280

(22) Filed: Dec. 16, 2020

(65) Prior Publication Data

US 2021/0101359 A1    Apr. 8, 2021

Related U.S. Application Data

(63) Continuation of application No. 16/022,794, filed on Jun. 29, 2018, now Pat. No. 11,020,932.
(Continued)

(51) Int. Cl.
*B32B 3/28* (2006.01)
*B32B 3/30* (2006.01)
(Continued)

(52) U.S. Cl.
CPC .............. *B32B 3/30* (2013.01); *B31F 1/2895* (2013.01); *B32B 3/263* (2013.01); *B32B 3/28* (2013.01);
(Continued)

(58) Field of Classification Search
CPC ....... B29C 55/00; B29C 55/02; B29C 55/023; B29C 55/18; B31F 1/24; B31F 1/26;
(Continued)

(56) References Cited

U.S. PATENT DOCUMENTS 3,682,736 A    8/1972  Akamatsu
3,990,935 A   11/1976  Lehmann
(Continued)

FOREIGN PATENT DOCUMENTS

CN      1697639 A    11/2005
CN    101222016 A     7/2008
(Continued)

OTHER PUBLICATIONS

All Office Actions, U.S. Appl. No. 16/022,794.
International Search Report and Written Opinion, PCT/US2018/040182.

*Primary Examiner* — Zachary M Davis
(74) *Attorney, Agent, or Firm* — Christian M. Best; Amanda Herman Berghauer

(57) ABSTRACT

Methods for making tip bonded formed laminates are made from multiple layers of formed substrates made from films which are bonded together at the tips of their formed protrusions. Tip bonded laminates can be designed with greater resistance to bending, improved resilience to compression, and can be patterned for directionally oriented responses to tensile loads. Also, tip bonded formed laminates made from multiple layers of formed substrates can use their layered structure to provide better aesthetics as well as better physical properties such as improved puncture resistance. Tip bonded formed laminates can be configured with thicker portions and designed patterns, which are appealing to consumers. A tip bonded formed laminate can be made from two or more formed substrates and can be used instead of a single, thick, unformed, substrate, so the laminate can use about the same amount of material, while still providing surprising functional benefits.

20 Claims, 25 Drawing Sheets

Related U.S. Application Data

(60) Provisional application No. 62/527,072, filed on Jun. 30, 2017, provisional application No. 62/527,114, filed on Jun. 30, 2017, provisional application No. 62/527,108, filed on Jun. 30, 2017.

(51) Int. Cl.

| | | |
|---|---|---|
| *B32B 7/05* | (2019.01) | |
| *B32B 7/03* | (2019.01) | |
| *B31F 1/28* | (2006.01) | |
| *B32B 27/30* | (2006.01) | |
| *B32B 3/26* | (2006.01) | |
| *B65D 33/00* | (2006.01) | |
| *B32B 7/14* | (2006.01) | |
| *B32B 27/32* | (2006.01) | |
| *B32B 27/34* | (2006.01) | |
| *B65D 33/16* | (2006.01) | |
| *B32B 37/20* | (2006.01) | |
| *B65F 1/00* | (2006.01) | |
| *B32B 7/12* | (2006.01) | |
| *B32B 37/12* | (2006.01) | |
| *B32B 38/00* | (2006.01) | |
| *B29C 65/48* | (2006.01) | |
| *B31B 170/30* | (2017.01) | |
| *B29L 31/00* | (2006.01) | |
| *B29C 65/00* | (2006.01) | |
| *B29C 65/52* | (2006.01) | |
| *B31B 170/20* | (2017.01) | |

(52) U.S. Cl.
CPC ............... *B32B 7/03* (2019.01); *B32B 7/05* (2019.01); *B32B 7/12* (2013.01); *B32B 7/14* (2013.01); *B32B 27/306* (2013.01); *B32B 27/32* (2013.01); *B32B 27/34* (2013.01); *B32B 37/12* (2013.01); *B32B 37/20* (2013.01); *B32B 38/0012* (2013.01); *B65D 33/00* (2013.01); *B65D 33/1608* (2013.01); *B65D 33/1616* (2013.01); *B65F 1/002* (2013.01); *B29C 65/48* (2013.01); *B29C 65/52* (2013.01); *B29C 66/112* (2013.01); *B29C 66/1122* (2013.01); *B29C 66/131* (2013.01); *B29C 66/1312* (2013.01); *B29C 66/438* (2013.01); *B29C 66/71* (2013.01); *B29L 2031/7129* (2013.01); *B31B 2170/20* (2017.08); *B31B 2170/30* (2017.08); *B32B 2038/0028* (2013.01); *B32B 2250/02* (2013.01); *B32B 2250/04* (2013.01); *B65F 2210/1026* (2013.01); *B65F 2250/1143* (2013.01)

(58) Field of Classification Search
CPC .......... B31F 1/289; B31F 1/2895; B32B 3/28; B32B 3/30
See application file for complete search history.

(56) References Cited

U.S. PATENT DOCUMENTS

| | | |
|---|---|---|
| 4,913,911 A | 4/1990 | Wildt |
| 4,931,346 A | 6/1990 | Nogueras |
| 5,156,793 A | 10/1992 | Buell |
| 5,620,545 A | 4/1997 | Braun et al. |
| 5,910,226 A | 6/1999 | Moeder |
| 6,066,385 A | 5/2000 | Kim |
| 6,080,276 A | 6/2000 | Burgess |
| 6,171,682 B1 | 1/2001 | Raidel |
| 6,302,998 B1 | 10/2001 | Burgess |
| 6,395,957 B1 | 5/2002 | Chen et al. |
| 6,403,505 B1 | 6/2002 | Groitzsch et al. |
| 6,481,483 B1 | 11/2002 | Kobayashi et al. |
| 6,602,580 B1 | 8/2003 | Hamilton et al. |
| 7,323,072 B2 | 1/2008 | Engelhart et al. |
| 7,682,686 B2 | 3/2010 | Curro et al. |
| 7,820,271 B2 | 10/2010 | Rasmussen |
| 7,879,172 B2 | 2/2011 | Kopacz et al. |
| 7,901,758 B2 | 3/2011 | Rasmussen |
| 8,263,210 B2 | 9/2012 | Rasmussen |
| 8,603,609 B2 | 12/2013 | Fraser et al. |
| 8,734,016 B2 | 5/2014 | Borchardt et al. |
| 8,784,972 B2 | 7/2014 | Sato et al. |
| 8,951,376 B2 | 2/2015 | Rasmussen |
| 9,108,355 B2 | 8/2015 | Kume et al. |
| 9,108,390 B2 | 8/2015 | Borchardt |
| 9,222,206 B2 | 12/2015 | Yamaguchi et al. |
| 9,296,176 B2 | 3/2016 | Escaffre et al. |
| 9,486,977 B2 | 11/2016 | Broering et al. |
| 9,815,266 B2 | 11/2017 | Rasmussen |
| 10,307,986 B2 | 6/2019 | Venkitaraman et al. |
| 2002/0150610 A1 | 10/2002 | Kono et al. |
| 2004/0131820 A1 | 7/2004 | Turner et al. |
| 2005/0095411 A1 | 5/2005 | Rasmussen |
| 2006/0083900 A1 | 4/2006 | Ashraf |
| 2006/0141215 A1 | 6/2006 | Jonsson |
| 2007/0254120 A1 | 11/2007 | Rasmussen |
| 2009/0157036 A1 | 6/2009 | Ponomarenko et al. |
| 2011/0052104 A1 | 3/2011 | Wilcoxen |
| 2011/0114249 A1 | 5/2011 | Rasmussen |
| 2012/0041406 A1 | 2/2012 | Alkmin et al. |
| 2012/0064280 A1 | 3/2012 | Hammons |
| 2012/0269466 A1 | 10/2012 | Dorsey et al. |
| 2013/0243982 A1 | 9/2013 | Borchardt et al. |
| 2013/0310796 A1 | 11/2013 | Zink et al. |
| 2015/0165724 A1 | 6/2015 | Cox et al. |
| 2016/0023426 A1 | 1/2016 | Rasmussen et al. |
| 2016/0052228 A1 | 2/2016 | Larsen |
| 2017/0312144 A1 | 11/2017 | Moritani |
| 2019/0001611 A1 | 1/2019 | Peck et al. |

FOREIGN PATENT DOCUMENTS

| | | |
|---|---|---|
| CN | 102846019 A | 1/2013 |
| CN | 203895112 U | 10/2014 |
| CN | 204849485 U | 12/2015 |
| DE | 4237298 A1 | 4/1994 |
| DE | 19636691 | 4/1998 |
| EP | 0079414 A1 | 5/1983 |
| EP | 2902187 A1 | 8/2015 |
| FR | 2431921 A1 | 2/1980 |
| IN | 193993 | 5/2006 |
| JP | 2016165885 A | 9/2016 |
| WO | 9412344 A1 | 6/1994 |
| WO | 9506770 A1 | 3/1995 |
| WO | 200454793 | 7/2004 |
| WO | 2006115574 A3 | 12/2006 |
| WO | 2008146594 | 4/2008 |
| WO | 2013091150 A1 | 6/2013 |
| WO | 201598373 | 7/2015 |
| WO | 2015143772 | 10/2015 |
| WO | 201640765 | 3/2016 |
| WO | 2016080247 A1 | 5/2016 |

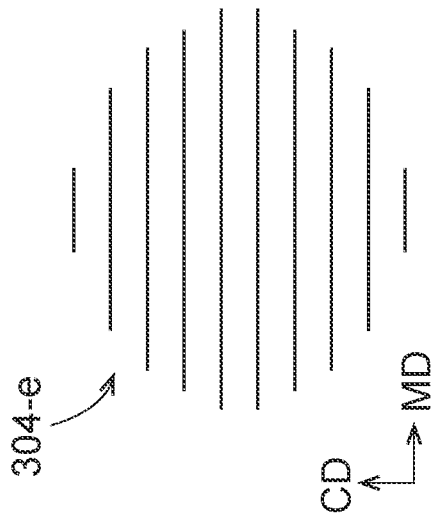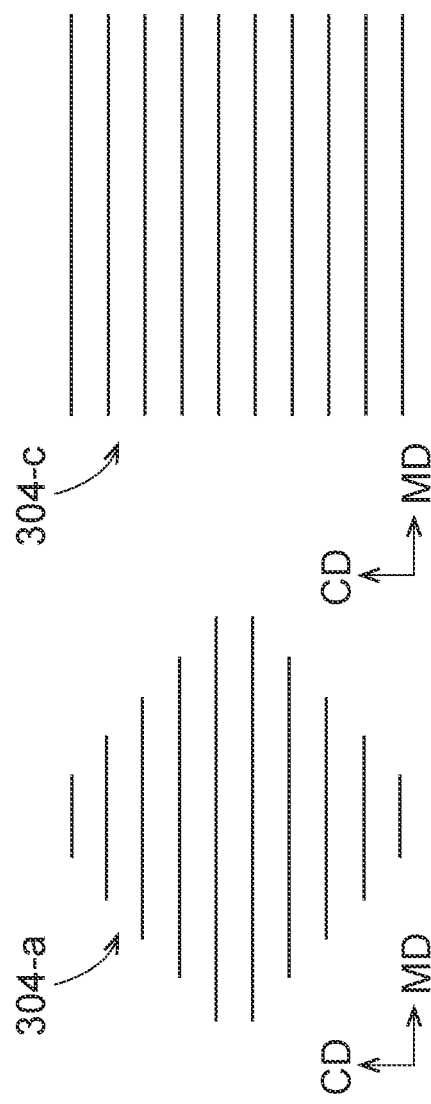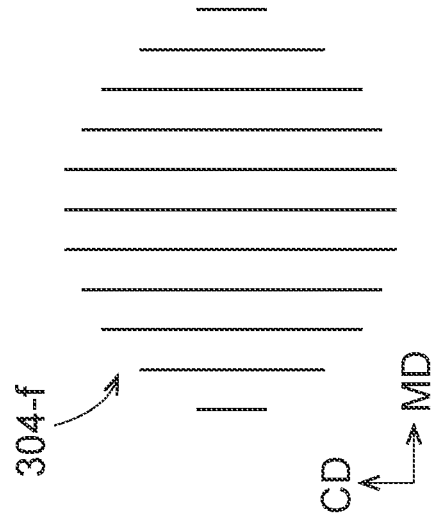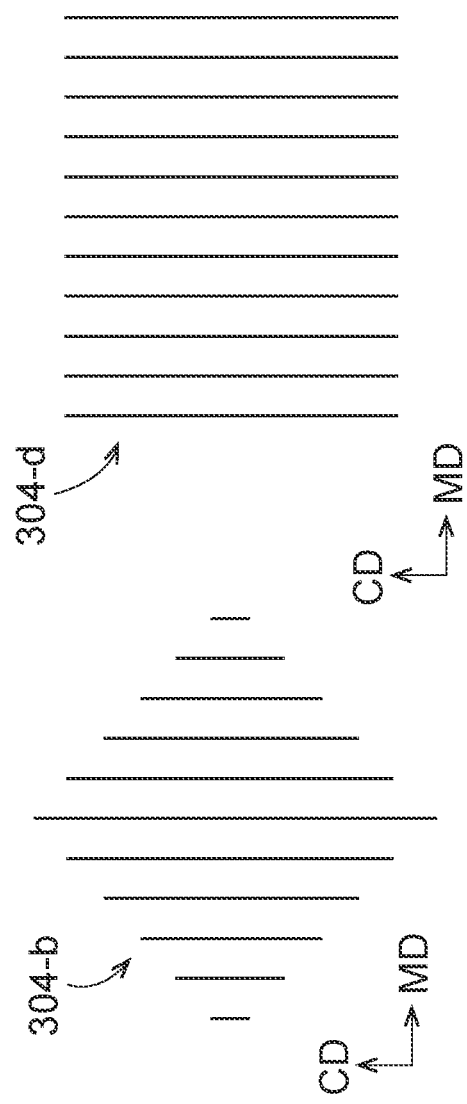

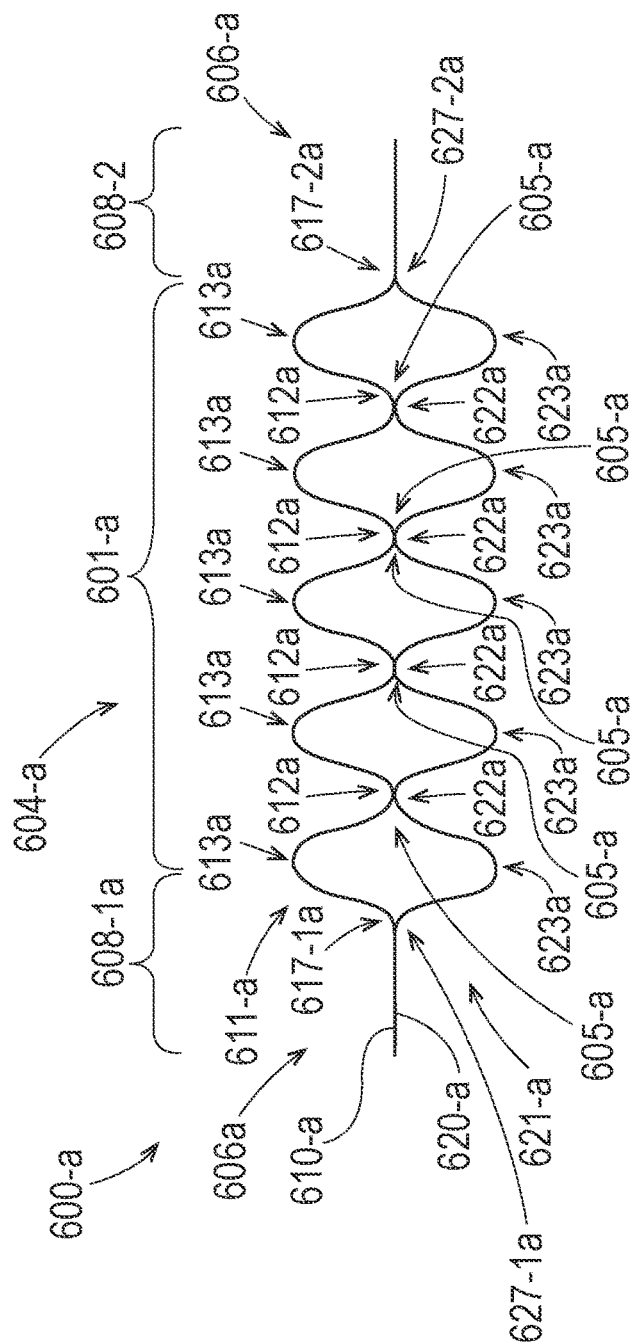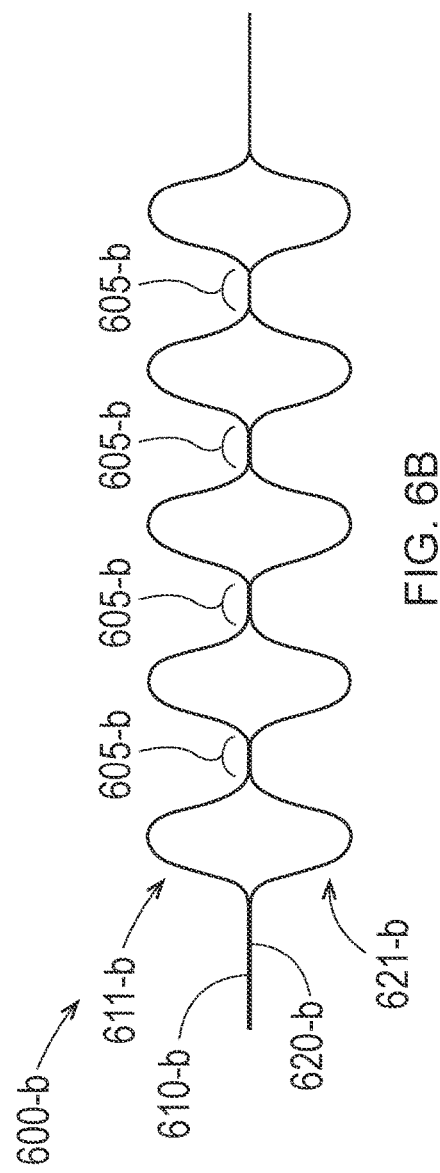
FIG. 6A
FIG. 6B

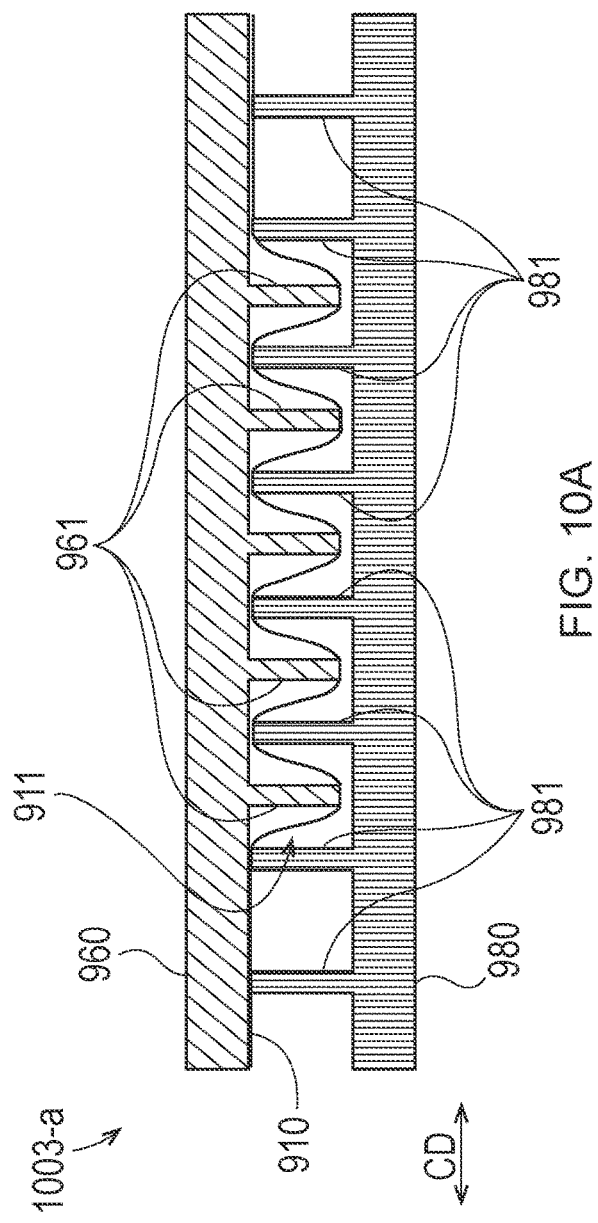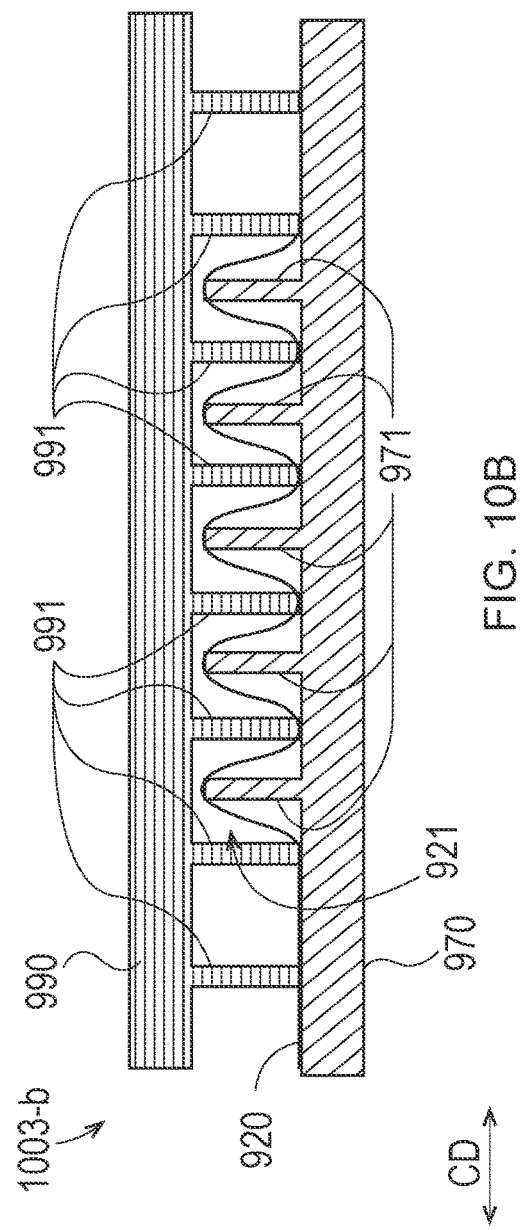

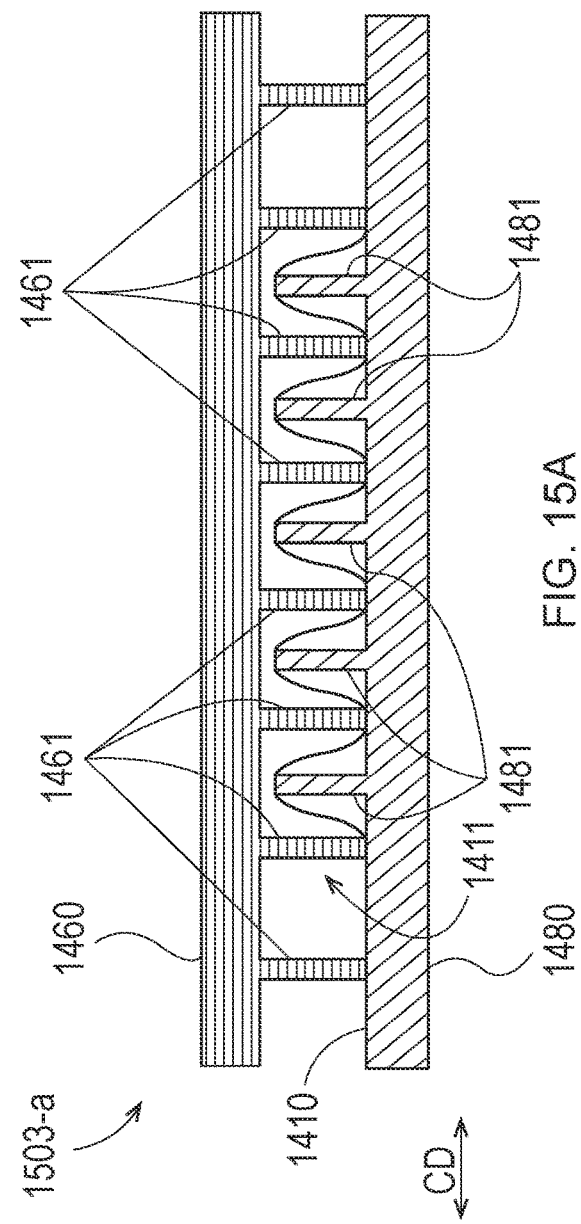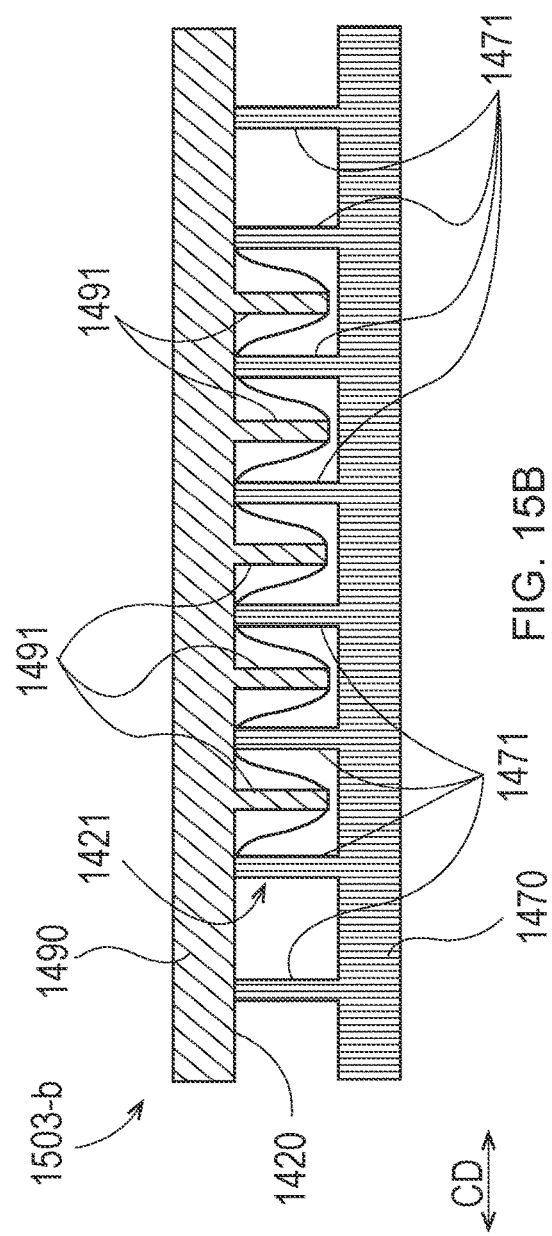

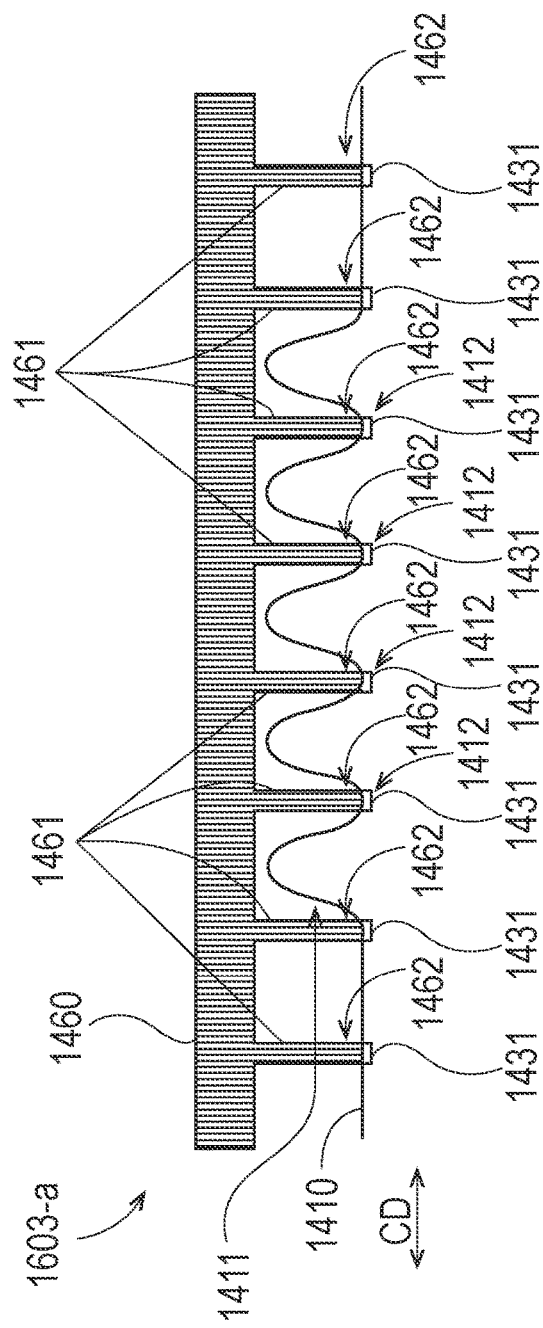
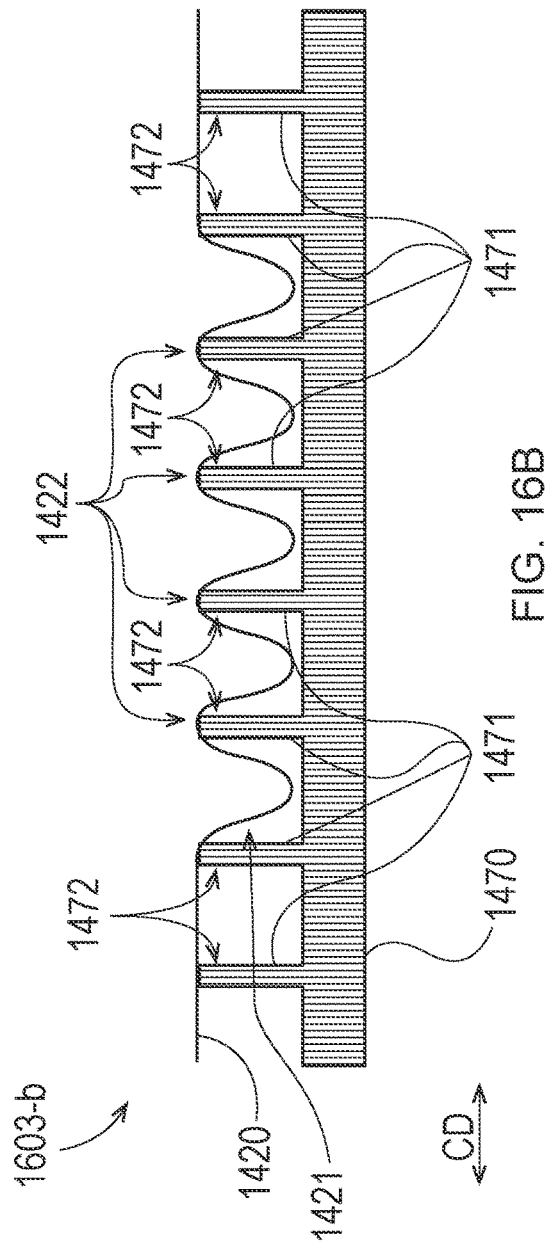
FIG. 16A
FIG. 16B

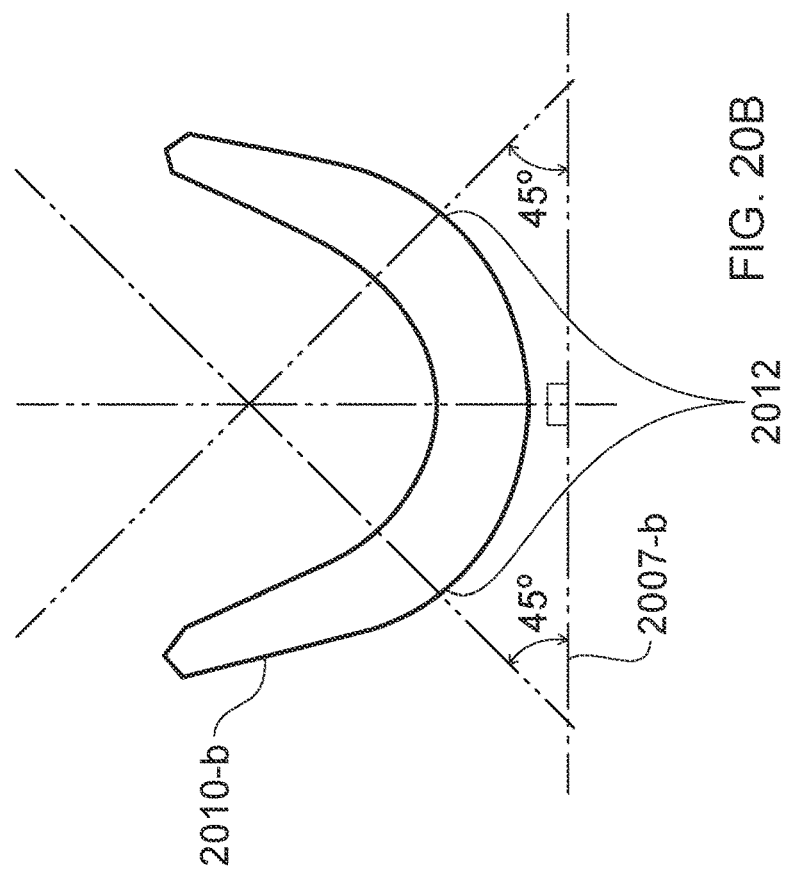
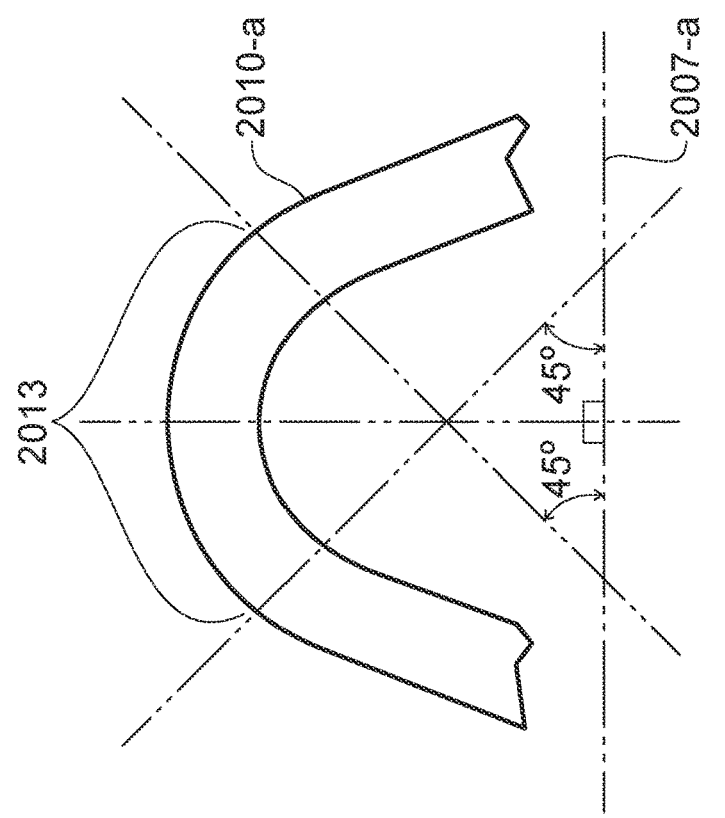

METHODS OF FORMING LAMINATES

CROSS REFERENCE TO RELATED APPLICATIONS

This application is a continuation of, and claims priority under 35 U.S.C. § 120 to, U.S. patent application Ser. No. 16/022,794, filed on Jun. 29, 2018, which claims the benefit, under 35 U.S.C. § 119(e), of U.S. Provisional Patent Application Ser. No. 62/527,072, U.S. Provisional Patent Application Ser. No. 62/527,114, and U.S. Provisional Patent Application Ser. No. 62/527,108, all three filed on Jun. 30, 2017, the entire disclosures of all of which are fully incorporated by reference herein.

FIELD

The present disclosure relates in general to method of forming laminate and in particular to laminates made from multiple layers of formed substrates made from films, which are bonded together at the tips of their formed protrusions.

BACKGROUND

Substrates such as films can serve as useful materials in many different articles, especially disposable consumer products; however, unformed, single layer substrates have certain limitations and disadvantages. Unformed, single layer substrates have little resistance to bending, slight resilience to compression, and generally isotropic responses to tensile loads. Further, unformed, single layer substrates rely heavily on the chemistry of their polymers and additives to provide aesthetics (e.g. opacity) and structural properties (e.g. puncture resistance). In addition, unformed, single layer substrates are usually thin and plain, which is unappealing to consumers.

SUMMARY

Laminates made from multiple layers of formed substrates, which are bonded together at the tips of their formed protrusions, as described herein, offer significant improvements over unformed, single layer substrates. Such tip bonded formed laminates can be designed with greater resistance to bending, improved resilience to compression, and can be patterned for directionally oriented responses to tensile loads. Also, tip bonded formed laminates made from multiple layers of formed substrates can use their layered structure to provide better aesthetics; for example, multiple layers of substrate can diffract and diffuse light more completely, resulting in increased opacity. Further, tip bonded formed laminates made from multiple layers of formed substrates can use their substrate formations to provide enhanced structural properties; for example, substrates with varying formations can distribute and absorb concentrated forces more effectively, resulting in improved puncture resistance. In addition, such tip bonded formed laminates can be configured with thicker portions and designed patterns, which are appealing to consumers. A tip bonded formed laminate can be made from two or more formed substrates and can be used instead of a single, thick, unformed, substrate, so the laminate can use about the same amount of material, while still providing the functional benefits described above. And, such tip bonded formed laminates can provide these benefits without relying on more expensive polymers and/or high concentrations of additives. As a result, tip bonded formed laminates made from multiple layers of formed substrates, offer significant improvements at a reasonable cost, when compared with unformed, single layer substrates.

The present invention thus relates to a laminate comprising: (a) a first film having a first plurality of integrally connected, incrementally stretched, elongated corrugations disposed side-by-side, each having: (i) a first inward facing trough, which has a first trough smallest thickness; (ii) a first outward facing crest, which has a first crest smallest thickness; and (iii) a first intermediate portion disposed between the first trough and the first crest, wherein the first intermediate portion has a first intermediate smallest thickness, which is less than the first crest smallest thickness; (b) a second film having a second plurality of integrally connected, incrementally stretched, elongated corrugations disposed side-by-side, each having: (i) a second inward facing trough, which has a second trough smallest thickness; (ii) a second outward facing crest, which has a second crest smallest thickness; and (iii) a second intermediate portion disposed between the second trough and the second crest, wherein the second intermediate portion has a second intermediate thickness, which is less than the second crest smallest thickness. The laminate further comprises a plurality of attachment areas, wherein each of the attachment areas is directly connected to a trough of a corrugation from the first plurality to a trough of a corrugation from the second plurality.

The present invention further relates to a method of forming a laminate, the method comprising: (a) incrementally mechanically stretching a first film by engaging at least a first portion of the first film with at least a first plurality of protrusions to form within the first portion a first plurality of integrally connected, elongated corrugations disposed side-by-side, each having a trough and a crest; and (b) incrementally mechanically stretching a second film by engaging at least a second portion of the second film with at least a second plurality of protrusions to form within the second portion a second plurality of integrally connected, elongated corrugations disposed side-by-side, each having a trough and a crest. While the portion of the first film is engaged with the first plurality of protrusions, and while the portion of the second film is engaged with the second plurality of protrusions, the first plurality of corrugations are directly connected to the second plurality of corrugations at a plurality of attachment areas, to form the laminate.

The present invention further relates to a machine for forming a laminate, the machine comprising: a machine direction and a cross direction; a first web supply apparatus and a second web supply apparatus, which are the only web supply apparatus of the machine. The machine further comprises a first rotating patterning roll, which is downstream from the first web supply apparatus and having a first plurality of rigid, elongated protrusions, each with a tip, and a second rotating patterning roll, which is downstream from the first web supply apparatus and having a second plurality of rigid, elongated protrusions, each with a tip. The first roll is positioned with respect to the second roll such that, as the rolls rotate, the tips of the first plurality are always unmated with the tips of the second plurality, and the tips of the first plurality come within joining proximity of from 0 to 5 millimeters of the tips of the second plurality.

BRIEF DESCRIPTION OF THE DRAWINGS

FIG. 3A illustrates a top view of a patterned area having corrugations oriented in a machine direction with an overall shape like a rhombus.

FIG. 3B illustrates a top view of a patterned area having corrugations oriented in a cross direction with an overall shape like a rhombus.

FIG. 3C illustrates a top view of a patterned area having corrugations oriented in a machine direction with an overall shape like a square.

FIG. 3D illustrates a top view of a patterned area having corrugations oriented in a cross direction with an overall shape like a square.

FIG. 3E illustrates a top view of a patterned area having corrugations oriented in a machine direction with an overall shape like a circle.

FIG. 3F illustrates a top view of a patterned area having corrugations oriented in a cross direction with an overall shape like a circle.

FIG. 6A illustrates an enlarged end view of a laminate with a patterned area formed by first and second films having corrugated and uncorrugated portions, wherein within the corrugated portion troughs of the films are directly connected at narrow attachment areas, and within the uncorrugated portions the films are adjacent.

FIG. 6B is a modified version of the laminate of FIG. 6A, wherein the films are directly connected at wide attachment areas.

FIG. 10A illustrates an enlarged partial cross-sectional view of two mating patterning rolls from the machine of FIG. 9, wherein the rolls are incrementally stretching a first substrate.

FIG. 10B illustrates an enlarged partial cross-sectional view of two mating patterning rolls from the machine of FIG. 9, wherein the rolls are incrementally stretching a second substrate.

FIG. 15A illustrates an enlarged partial cross-sectional view of two mating patterning rolls from the machine of FIG. 14, wherein the rolls are incrementally stretching a first substrate.

FIG. 15B illustrates an enlarged partial cross-sectional view of two mating patterning rolls from the machine of FIG. 14, wherein the rolls are incrementally stretching a second substrate.

FIG. 16A illustrates an enlarged partial cross-sectional view of the first substrate engaged with the first patterning roll from the machine of FIG. 14, wherein an adhesive is applied to troughs of corrugations of the first substrate and to the adjacent uncorrugated portions.

FIG. 16B illustrates an enlarged partial cross-sectional view of the second substrate engaged with the second patterning roll from the machine of FIG. 14.

FIG. 20A is an enlarged end view of a portion of an exemplary laminate, which illustrates the extent of a crest.

FIG. 20B is an enlarged end view of a portion of an exemplary laminate, which illustrates the extent of a trough.

DETAILED DESCRIPTION

Tip bonded formed laminates of the present disclosure can be made from multiple layers of formed substrates, such as films, and can offer significant improvements over unformed, single layer substrates, including: greater resistance to bending, improved resilience to compression, directionally oriented responses to tensile loads, better aesthetics, enhanced structural properties, thicker portions, and designed patterns, without relying on more expensive polymers and/or high concentrations of additives; as a result, such tip bonded formed laminates offer significant improvements at a reasonable cost, when compared with unformed, single layer substrates.

Throughout the figures, the machine direction is shown as MD and the cross direction is shown as CD; a labeled arrow indicates the orientation of the labeled direction with respect to the figure, while a labeled X indicates that the labeled direction is orthogonal (i.e. into) to the page. And, throughout the figures, laminates are illustrated with patterned areas having particular numbers of corrugations, however, for any patterned area disclosed herein, any number of corrugations may be used; as examples, a patterned area can have 2-100 corrugations, or any number of corrugations between 2 and 100, or any range formed by any of these values such as 2-50 corrugations, 3-40 corrugations, 4-30 corrugations, 5-20 corrugations, etc.

Figure 1:
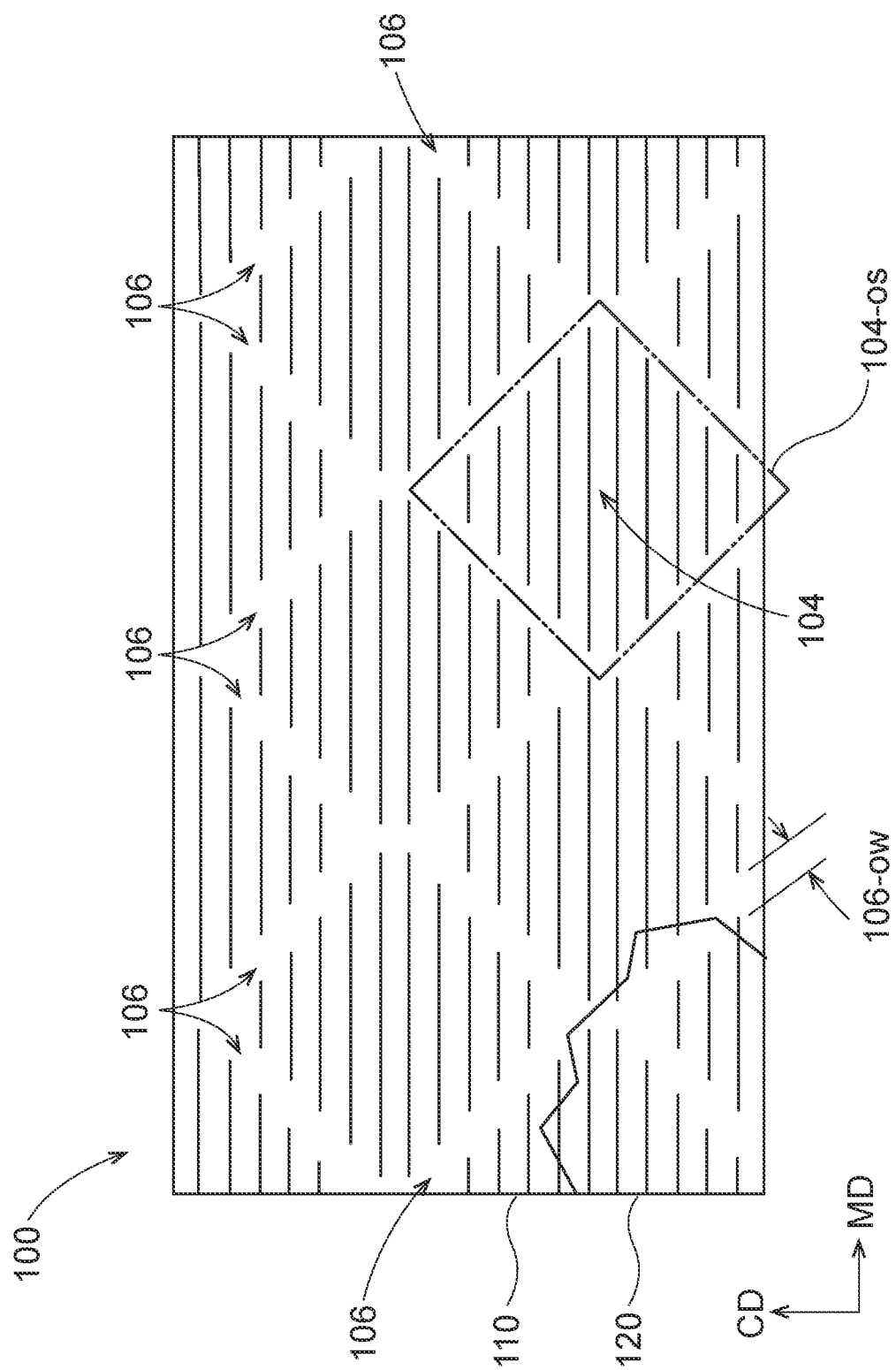
FIG. 1 illustrates a partially broken top view of a portion of a laminate with patterned areas having corrugations oriented in a machine direction.

FIG. 1 illustrates a partially broken top view of a portion of a laminate 100 with patterned areas having corrugations oriented lengthwise in a machine direction. The laminate 100 is made of a first substrate 110 on the top and a second substrate 120 (shown in the broken portion) on the bottom of the laminate 100. The first substrate 110 is directly connected to the second substrate 120 at a plurality of attachment areas shown by straight line segments, which are parallel with the machine direction. The first substrate 110 and the second substrate 120 each include corrugated portions disposed between adjacent attachment areas and uncorrugated portions disposed outside of the attachment areas. A plurality of attachment areas forms the patterned area 104, which has an overall shape 104-*os* like a rhombus; however, in various embodiments, for any laminate disclosed herein, the laminate may include patterned areas having any overall shape disclosed herein or known in the art of patterned substrates. The attachment areas that form the patterned area 104 are repeating over the laminate 100, to form a plurality of discrete patterned areas, each with the same configuration, including the same overall shape; however, in various embodiments, for any laminate disclosed herein, the laminate may include two or more different patterned areas, which may or may not repeat in a pattern over the laminate. The patterned areas are arranged in repeating linear arrays, which form a tessellating pattern, wherein the patterned areas are separated from each other by linear pathways 106, disposed between the patterned areas, and wherein the pathways are formed by the uncorrugated portions of the substrates. Each of the pathways has an overall width 106-*ow*, which is substantially uniform. For the laminate 100 and for any laminate disclosed herein, any of the pathways can have an overall width of 1-100 millimeters, or any integer value between 1 and 100 millimeters, or any range formed by any of these values, such as 1-50 millimeters, 1-20 millimeters, 1-10 millimeters, etc; also part, parts, or all of any pathway disposed between patterned areas can have a variable overall width and/or can be curved.

In various embodiments, the laminates disclosed herein can exhibit directionally variable bending stiffness. The attachment areas can act like beams in their direction of orientation, providing directional strengthening of the connected substrates. The pathways may or may not act like hinges, depending on their configuration within the laminate. As an example, a laminate may have a first direction (parallel with the overall planar orientation of the laminate) having a lowest bending stiffness for the laminate, and a second direction (also parallel with the overall planar orientation of the laminate), which differs from the first direction (e.g. is perpendicular to the first direction), having a highest bending stiffness for the laminate, wherein the highest bending stiffness is 50-10,000% greater than the lowest bending stiffness, or any integer value between 50% and 5,000%, or any range formed by any of these values, such as 50-2,000%, 75-1,000%, 100-500%, etc.

In the embodiment of FIG. 1, since all of the attachment areas of the laminate 100 are oriented in the machine direction, the attachment areas provide the laminate 100 with a relatively higher bending stiffness in the machine direction, and a relatively lower bending stiffness in the cross direction. And, in the embodiment of FIG. 1, since the pathways 106 are linear pathways disposed in parallel, the pathways 106 provide the laminate 100 with relatively lower bending stiffness at angles taken perpendicular to the pathways.

Figure 2:
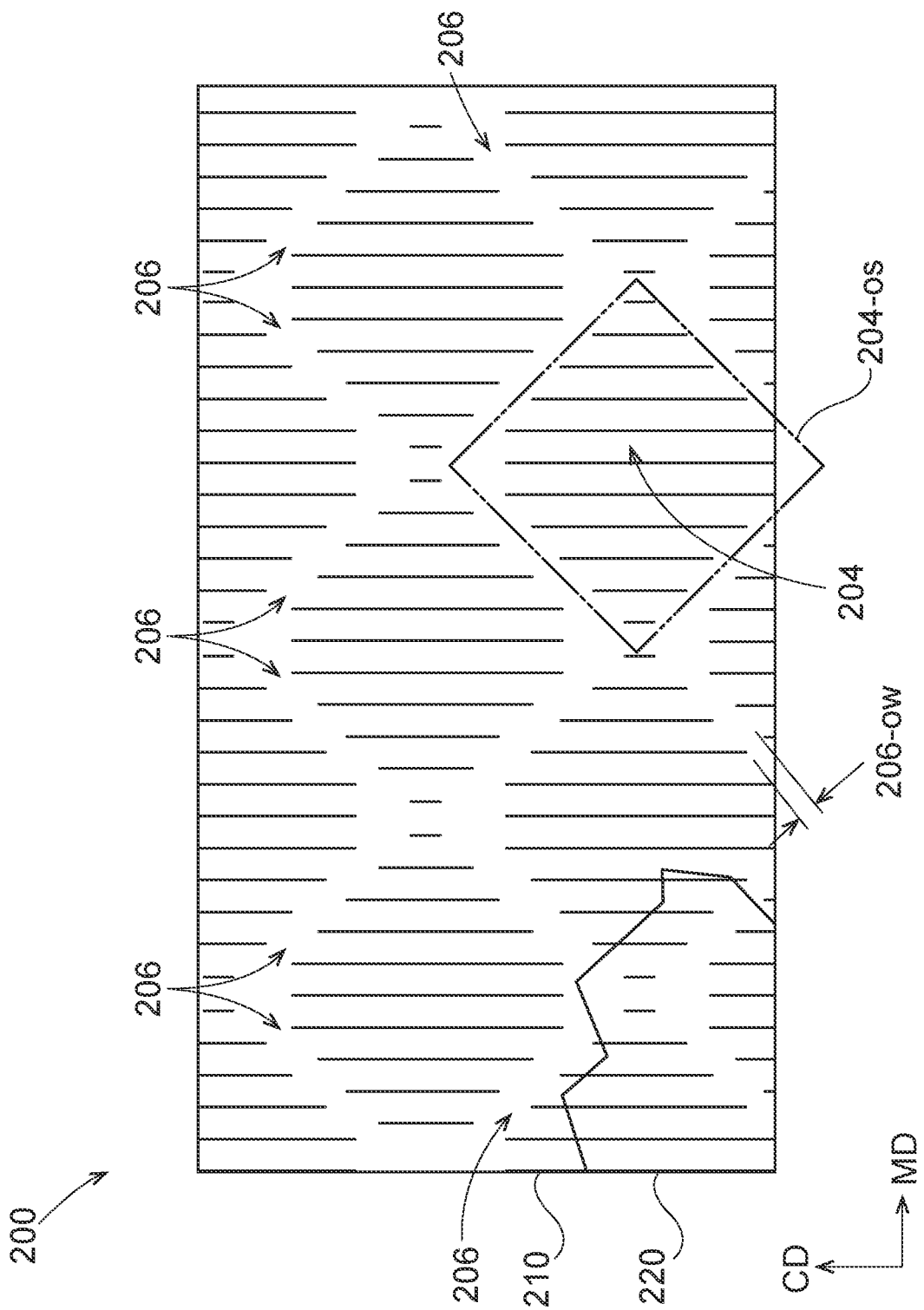
FIG. 2 illustrates a partially broken top view of a portion of a laminate with patterned areas having corrugations oriented in a cross direction.
Figure 4A:
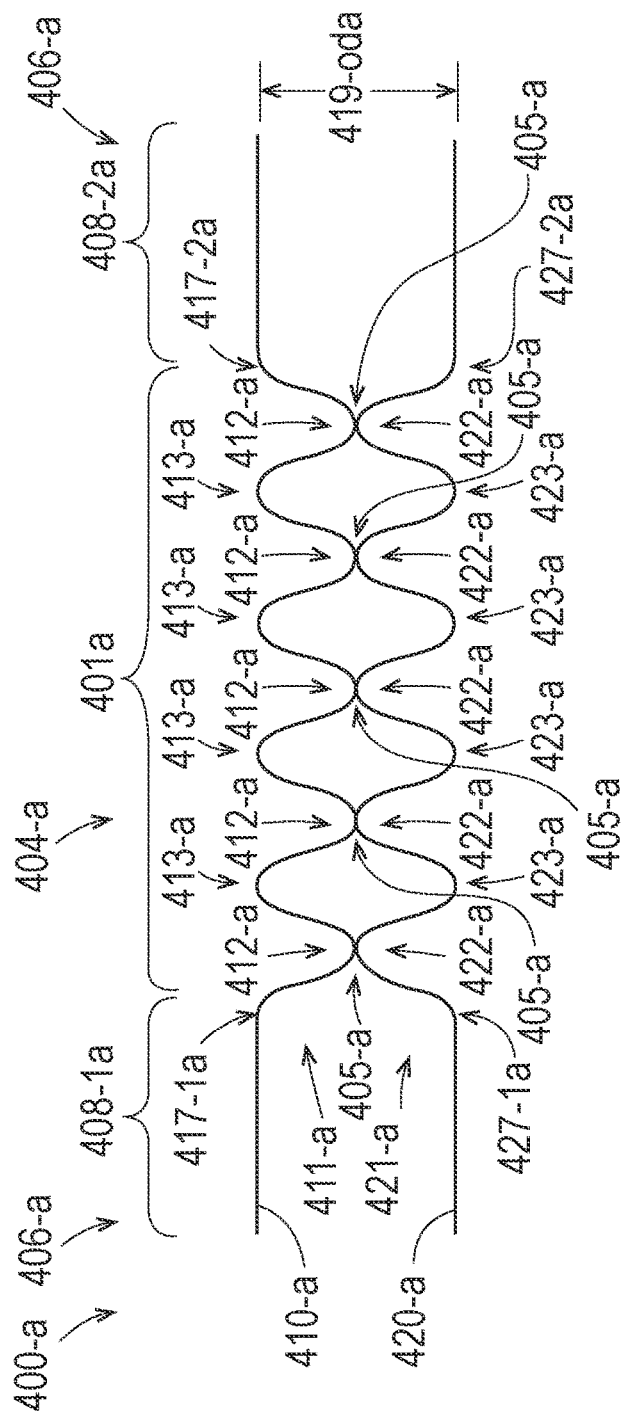
FIG. 4A illustrates an enlarged end view of a laminate with a patterned area formed by first and second substrates, which are films having corrugated and uncorrugated portions, wherein within the corrugated portion troughs of the films are directly connected at narrow attachment areas, and within the uncorrugated portions the films are offset.
Figure 4B:
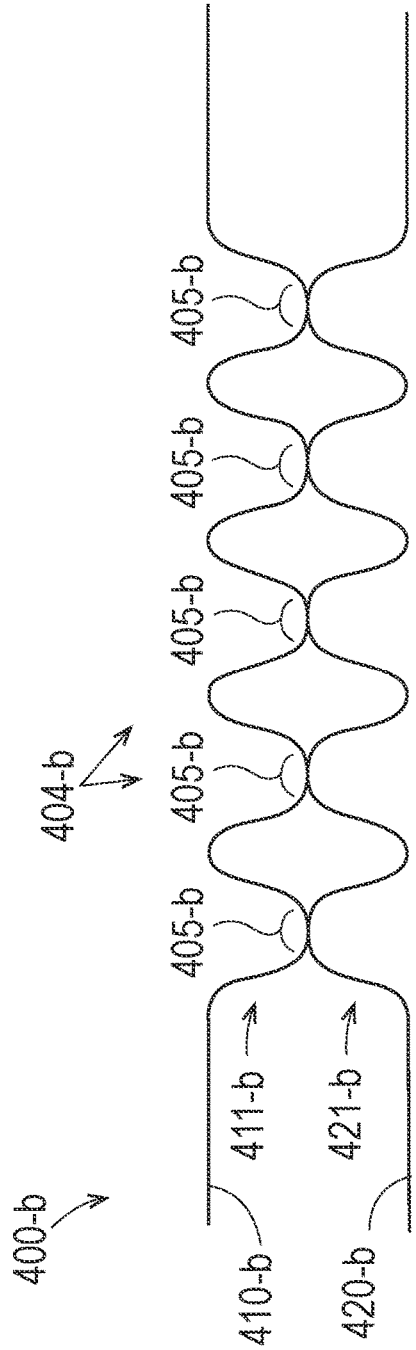
FIG. 4B is a modified version of the laminate of FIG. 4A, wherein the films are directly connected at wide attachment areas.

The laminate 100 can be configured according to any laminate described herein, such as the laminate 400-*a* of FIG. 4A, the laminate 400-*b* of FIG. 4B, the laminate 600-*a* of FIG. 6A, or the laminate 600-*b* of FIG. 6B, or any alternative laminate embodiment disclosed herein or known in the art. In various embodiments, the laminate 100 can be modified by adding first and/or second outer substrates, such as in the laminate 500-*a* of FIG. 5A, the laminate 500-*b* of FIG. 5B, the laminate 700-*a* of FIG. 7A, or the laminate 700-*b* of FIG. 7B. The laminate 100 can be made according to the method 800 of FIG. 8, or made according to any alternative method embodiment disclosed herein. The laminate 100 can be made using the machine 902 of FIG. 9, the machine 1402 of FIG. 14, or made using any alternative machine embodiment disclosed herein. In various embodiments, part, parts, or all of the laminate 100 or any laminate disclosed herein can be modified such that some or all of the corrugations are oriented at a positive or negative angle from 1-89 degrees with respect to the machine direction, or any integer value between 1 and 89 degrees, or any range formed by any of these values, such as 1-60 degrees, 1-45 degrees, 1-30 degrees, 30-89 degrees, 45-89 degrees, 60-89 degrees, 30-60 degrees, 40-50 degrees, etc. FIG. 2 illustrates a partially broken top view of a portion of a laminate 200 with patterned areas having corrugations oriented lengthwise in the cross direction. The laminate 200 is made of a first substrate 210 and a second substrate 220, with discrete patterned areas including patterned area 204 with an overall shape like a rhombus, repeating over the laminate 200, separated from each other by pathways 206. The laminate 200 of FIG. 2 is configured in the same way as the laminate 100 of FIG. 1, with like-numbered elements configured in the same way, except as described differently below. The first substrate 210 and the second substrate 220 are directly connected at a plurality of attachment areas shown by line segments, which are parallel with the cross direction. Since all of the attachment areas of the laminate 200 are oriented in the cross direction, the attachment areas provide the laminate 200 with a relatively higher bending stiffness in the cross direction, and since the pathways 206 are linear pathways disposed in parallel, the pathways 206 provide the laminate 200 with relatively lower bending stiffness at angles taken perpendicular to the pathways. The laminate 200 can be configured or modified in any of the ways that the laminate 100 of FIG. 1 can be configured or modified. The laminate 200 can be made according to the method 800 of FIG. 8, or made according to any alternative method embodiment disclosed herein. The laminate 200 can be made using the machine 1302 of FIG. 13, the machine 1802 of FIG. 18, or made using any alternative machine embodiment disclosed herein.

FIGS. 3A-3F illustrate top views of exemplary patterned areas having attachment areas that form corrugations oriented in various directions, and patterned areas with various overall shapes. FIG. 3A illustrates a patterned area 304-*a* having corrugations oriented lengthwise in the machine direction and an overall shape like a rhombus, as shown with the patterned area 104 in the laminate 100 of FIG. 1. FIG. 3B illustrates a patterned area 304-*b* having corrugations oriented lengthwise in the cross direction, and an overall shape like a rhombus, as shown with the patterned area 204 in the laminate 200 of FIG. 2. FIG. 3C illustrates a patterned area 304-*c* having corrugations oriented lengthwise in the machine direction, and an overall shape like a square, which can be used for any patterned area of any laminate disclosed herein. FIG. 3D illustrates a patterned area 304-*d* having corrugations oriented lengthwise in a cross direction, and an overall shape like a square, which can be used for any patterned area of any laminate disclosed herein. In various embodiments, a laminate can have patterned areas with an overall shape like a rectangle, trapezoid, triangle, pentagon, hexagon, heptagon, octagon, or any other regular or irregular polygon having any number of sides. FIG. 3E illustrates a patterned area 304-*e* having corrugations oriented lengthwise in a machine direction, and an overall shape like a circle. FIG. 3F illustrates a patterned area 304-*f* having corrugations oriented lengthwise in a cross direction, and an overall shape like a circle. In various embodiments, a laminate can have patterned areas with an overall shape like an oval, ellipse, or any other rounded shape having any configuration. Any of the overall shapes of the exemplary patterned areas of FIGS. 3A-3F or any other overall shape disclosed herein or known in the art can be used for any patterned area in any laminate disclosed herein, in any workable combination.

FIGS. 4A-7B illustrate enlarged end views of laminates formed, at least in part, by a corrugated portion of a first substrate directly connected to a corrugated portion of a second substrate. These laminates are illustrated with patterned areas having a particular number of corrugations, however any number of corrugations may be used, including any number disclosed herein, for any embodiment of laminate disclosed herein. These laminates are illustrated with corrugations having particular, uniform proportions, however, these particular shapes are not required, and the uniformity and/or proportions of part, parts, or all of one or more of any of the corrugations may vary within any patterned area or between patterned areas in any substrate and/or between any substrates, for any embodiment of laminate disclosed herein. Any of the embodiments of FIGS. 4A-7B can be used to form a tip bonded formed laminate with some or all of the corrugations oriented in any convenient direction for the laminate, such as the machine direction, the cross direction, or any positive or negative angle from 1-89 degrees with respect the machine direction and/or the cross direction.

FIGS. 4A-4B, 5A-5B, 6A-6B, and 7A-7B illustrate embodiments wherein the laminates are formed, at least in part, by a corrugated portion of a first film directly connected to a corrugated portion of a second film. For ease of illustration, each substrate is illustrated as a smooth, continuous film having a particular uniform thickness, however these particular shapes are not required, and the smoothness, continuity, and/or thickness of part, parts, or all of one or more of any of the film substrates may vary within any patterned area and/or between patterned areas in any substrate and/or between any substrates, in any way disclosed herein and/or in any way known in the art, for any embodiment of laminate disclosed herein. Although each of these embodiments describes and illustrates a first film directly connected to a second film, in various embodiments, some or all of the connections between the films may be indirect connections, which include one or more intermediate materials (in addition to any adhesive used for making the connection). Also, any of the embodiments disclosed herein can be modified to include one or more intermediate substrates (e.g. film layers), disposed between the first film and the second film.

FIG. 4A illustrates an enlarged end view of a laminate 400-*a* formed by a first substrate, which is a first film 410-*a* and a second substrate, which is a second film 420-*a*. The laminate 400-*a* has a discrete patterned area 404-*a* surrounded by pathways 406-*a*. The laminate 400-*a* also has a central corrugated portion 401-*a* and uncorrugated portions 408-1*a* and 408-2*a* disposed on either side of the corrugated portion 401-*a*. Within the corrugated portion 401-*a*, the first film 410-*a* is directly connected to the second film 420-*a* at a plurality of long (into the page) but relatively narrow (across the page) attachment areas 405-*a*. The corrugated portion 401-*a* forms the patterned area 404-*a*. Within the uncorrugated portions 408-1*a* and 408-2*a*, the first film 410-*a* and the second film 420-*a* are not connected, but are offset from each other by offset distance 419-*oda*. The uncorrugated portions 408-1*a* and 408-2*a* of the films 410-*a* and 420-*a* form the pathways 406-*a* between the patterned area 404-*a* and other patterned areas of the laminate 400-*a*.

In the corrugated portion 401-*a*, the first film 410-*a* has a first plurality of corrugations 411-*a*, with a shape like a repeating wave having troughs 412-*a* and crests 413-*a*. In the first film 410-*a* of FIG. 4A, the corrugations 411-*a* have the same wavelength and amplitude, however, in various embodiments, for any laminate disclosed herein, a first substrate may have a patterned area with corrugations having varying wavelength and/or amplitude. The corrugations 411-*a* are disposed linearly, in parallel, side-by-side and are integrally connected to each other since they are formed from the same material, which is the first film 410-*a*.

However, in various embodiments, for any laminate disclosed herein, some or all of the corrugations in a patterned area may not be completely parallel with each other, but may have overall orientations (taken end-to-end) that are 1-15 degrees out of parallel with each other, or out of parallel by any integer value between 1 and 15 degrees, or by any range formed by any of these values, such as 1-10 degrees, 1-5 degrees, 1-2 degrees, etc. Each of the corrugations 411-*a* is incrementally stretched, such that the troughs 412-*a* and the crests 413-*a* are permanent features of the first film 410-*a* separated by portions of the first film 410-*a* that are extended and thinned by a solid state formation process. Each of the corrugations 411-*a* is elongated since it has an overall length (into to the page) that is greater than its overall width. In various embodiments, for any patterned area of any laminate disclosed herein, one, or some, or all of the corrugations may be continuous with an overall length that continues all the way along the laminate and/or one, or some, or all of the corrugations may be discrete with an overall length that does not continue all the way along the laminate. Table 1, set forth below, describes nine embodiments of laminate, which represent various combinations of corrugation lengths and corrugations orientations for the first substrate and the second substrate, which are contemplated as applicable to any laminate described herein. In Table 1, "angled at α" means that an elongated corrugation has an overall orientation that is oriented at any angle α of 1-89 degrees between the machine direction and the cross direction.

TABLE 1

| | corrugations of first substrate | | corrugations of second substrate | |
|---|---|---|---|---|
| # | length | orientation | length | orientation |
| 1 | continuous | machine direction | continuous | machine direction |
| 2 | continuous | machine direction | discrete | machine direction |
| 3 | discrete | machine direction | discrete | machine direction |
| 4 | continuous | cross direction | continuous | cross direction |
| 5 | continuous | cross direction | discrete | cross direction |
| 6 | discrete | cross direction | discrete | cross direction |
| 7 | continuous | angled at α | continuous | angled at α |
| 8 | continuous | angled at α | discrete | angled at α |
| 9 | discrete | angled at α | discrete | angled at α |

In various embodiments, for any patterned area of any laminate disclosed herein, some or all of the corrugations may have a same overall length and/or some or all of the corrugations may have differing overall lengths; the overall lengths of the corrugations may be selected such that that the patterned area has a particular overall shape (when viewed from a top view), such as any overall shape disclosed herein or known in the art.

The second film 420-*a* has the same configuration as the first film 410-*a*, except that the second film 420-*a* is configured and oriented as a mirrored version of the first film 410-*a*, mirrored around an imaginary horizontal line disposed along the bottoms of the troughs 412-*a* of the first film 410-*a*. So, in the corrugated portion 401-*a*, the second film 420-*a* has a second plurality of wave-like corrugations 421-*a*, which are also integrally connected, discrete, elongated, incrementally stretched, and disposed linearly, in parallel, side-by-side, with troughs 422-*a* and crests 423-*a*. Due to the mirrored configuration, the corrugations 421-*a* have the same wavelength and amplitude as the corrugations 411-*a*, and all of the troughs 412-*a* and 422-*a* face inward while all of the crests 413-*a* and 423-*a* face outward. The first film 410-*a* is aligned both side-to-side and lengthwise (into the page) with the second film 420-*a* and is attached to the second film 420-*a* by a plurality of attachment areas 405-*a*. Since the attachment areas 405-*a* attach the first film 410-*a* to the second film 420-*a*, the corrugations 411-*a* have the same overall lengths as the corrugations 421-*a*.

In various embodiments, for any patterned area of any laminate disclosed herein, a second substrate may not be a mirrored version of the first substrate, but may differ from the first substrate in any way disclosed herein; in particular, the corrugations of the second substrate may differ in wavelength and/or amplitude from the corrugations of the first substrate. Table 2, set forth below, describes nine embodiments of laminate, which represent various combinations of corrugation wavelengths and amplitudes for the first substrate and the second substrate, which are contemplated as applicable to any laminate described herein. In Table 2, "same," "smaller," and "larger" are used as terms of relative size; same means corrugations having an equivalent size; smaller means corrugations having a relatively lesser size; larger means corrugations having a relatively greater size; the corrugations of either substrate may otherwise have any size disclosed herein or known in the art.

TABLE 2

| | conjugations of first substrate | | corrugations of second substrate | |
|---|---|---|---|---|
| # | wavelength | amplitude | wavelength | amplitude |
| 1 | same | same | same | same |
| 2 | smaller | same | larger | same |
| 3 | larger | same | smaller | same |
| 4 | same | smaller | same | larger |
| 5 | smaller | smaller | larger | larger |
| 6 | larger | smaller | smaller | larger |
| 7 | same | larger | same | smaller |
| 8 | smaller | larger | larger | smaller |
| 9 | larger | larger | smaller | smaller |

The plurality of attachment areas 405-*a* directly connects the troughs 412-*a* with the troughs 422-*a* such that each of the troughs 412-*a* is directly connected to a single one of the troughs 422-*a*, and each of the troughs 422-*a* is directly connected to a single one of the troughs 412-*a*; however, in various embodiments, for any patterned area of any laminate disclosed herein, multiple troughs from the corrugations of the first substrate may be directly connected to a single trough from a corrugation of the second substrate. Any of the attachment areas disclosed herein can be formed by one or more adhesives and/or fused portions, which extend continuously or discontinuously along part or parts of about all, approximately all, substantially all, nearly all, or all of either or both of the connected troughs; any suitable adhesive for connecting films may be used, such as 5100-N ZP (Full Care), available from H. B. Fuller of Saint Paul, Minn., United States of America; the films may be fused together by the application of heat and/or pressure to the films as they are held in contact, in any way known in the art. In the embodiment of FIG. 4A, the corrugations 411-*a* of the first film 410-*a* are only attached to the corrugations 421-*a* of the second film 420-*a* at the plurality of attachment areas 405-*a*. Further, in the embodiment of FIG. 4A, the first film 410-*a* is only attached to the second film 420-*a* at the plurality of attachment areas 405-*a*; however in various embodiments, for any laminate disclosed herein, the first substrate and the second substrate may be joined together in various ways at one or more other locations on the laminate, such as locations in uncorrugated portions.

The first film 410-*a* changes from a wavelike shape in the corrugations 411-*a* of the corrugated portion 401-*a* to a flat shape in the uncorrugated portions 408-1a and 408-2a; these changes in shape occur at a first transition 417-1a on one side of the corrugated portion 401-a and at a second transition 417-2a on the other side of the corrugated portion 401-a. Similarly, the second film 420-a changes from a wavelike shape in the corrugations 421-a of the corrugated portion 401-a to a flat shape in the uncorrugated portions 408-1a and 408-2a; these changes in shape occur at a first transition 427-1a on one side of the corrugated portion 401-a and at a second transition 427-2a on the other side of the corrugated portion 401-a. The first transitions 417-1a and 427-1a are offset from each other, so, in the uncorrugated portion 408-1a, the first film 410-a and the second film 420-a are offset from each other; the second transitions 417-2a and 427-2a are also offset from each other, so, in the uncorrugated portion 408-2a, the first film 410-a and the second film 420-a are offset from each other; however, in various embodiments, for any laminate disclosed herein, the substrates may be proximate to each other and/or in contact with each other at one or more other locations on the laminate, in the uncorrugated portions.

FIG. 4B illustrates an enlarged end view of a laminate 400-b formed by a first substrate, which is a first film 410-b and a second substrate, which is a second film 420-b. The laminate 400-b of FIG. 4B is configured in the same way as the laminate 400-a of FIG. 4A, with like-numbered elements configured in the same way, except that the first film 410-b and the second film 420-b are directly connected at a plurality of attachment areas 405-b, which are relatively wider (across the page) than the attachment areas 405-a of the laminate 400-a. In alternative embodiments, the laminate 400-b can be modified in any of the ways that the laminate 400-a of FIG. 4A can be modified.

Figure 5A:
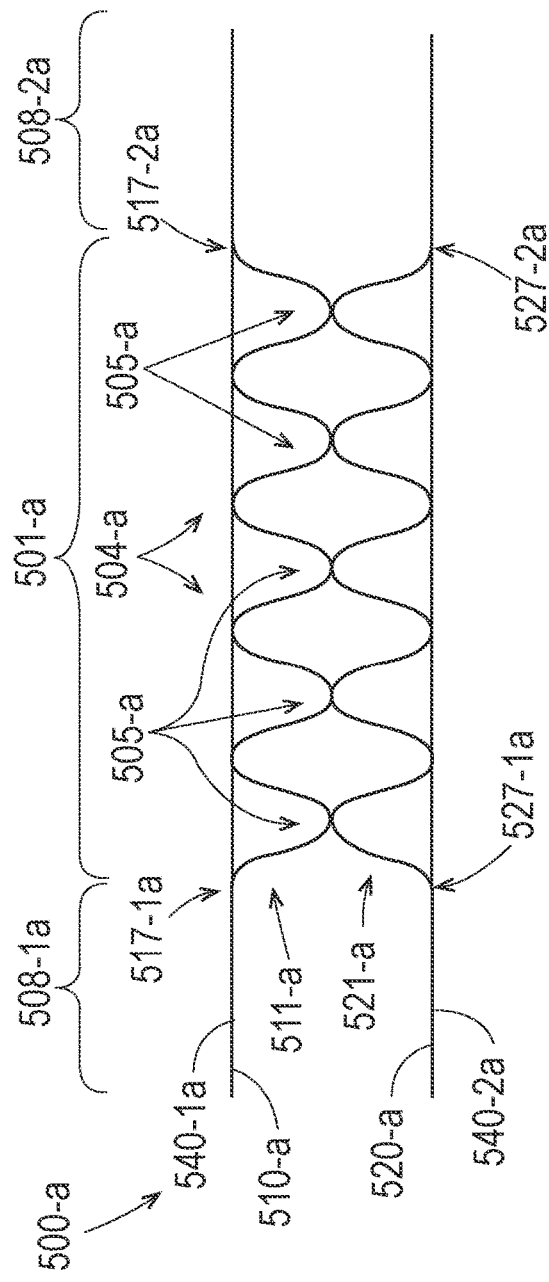
FIG. 5A illustrates an enlarged end view of a modified version of the laminate of FIG. 4A, with outer films joined to the first and second films.

FIG. 5A illustrates an enlarged end view of a laminate 500-a formed by a first substrate, which is a first film 510-a, a second substrate, which is a second film 520-a, a third substrate, which is a third film 540-1a, and a fourth substrate, which is a fourth film 540-2a. The laminate 500-a of FIG. 5A is configured in the same way as the laminate 400-a of FIG. 4A, with like-numbered elements configured in the same way, except that the laminate 500-a includes the third film 540-1a, which is an outer film joined to the outward facing crests of the corrugations of the first film 510-a; the third film 540-1a can be joined to the first film 510-a directly or indirectly in any way described herein and/or known in the art. The laminate 500-a includes the fourth film 540-2a, which is an outer film joined to the outward facing crests of the corrugations of the second film 520-a; the fourth film 540-2a can be joined to the second film 520-a directly or indirectly in any way described herein and/or known in the art. In alternative embodiments, the laminate 500-a can be modified in any of the ways that the laminate 400-a of FIG. 4A can be modified. For any laminate with outer substrates, disclosed herein, part, parts, or all of either or both of the outer substrates may be omitted from the laminate and/or other substrates may be added in place of part, parts, or all of either or both of the outer substrates, in any workable combination. In alternative embodiments, for any laminate disclosed herein, one or more additional substrates (e.g. films or nonwovens) and/or structures, in any form disclosed herein or known in the art, may be added to the laminate.

Figure 5B:
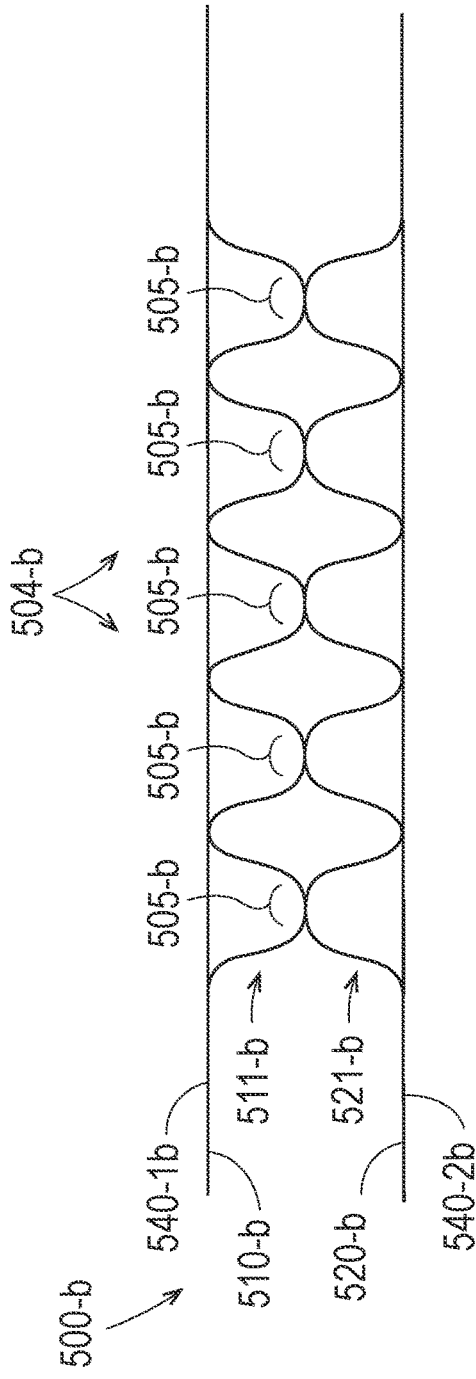
FIG. 5B illustrates an enlarged end view of a modified version of the laminate of FIG. 4B, with outer films joined to the first and second films.

FIG. 5B illustrates an enlarged end view of a laminate 500-b formed by a first substrate, which is a first film 510-b, a second substrate, which is a second film 520-b, a third substrate, which is a third film 540-1b, and a fourth substrate, which is a fourth film 540-2b. The laminate 500-b of FIG. 5B is configured in the same way as the laminate 400-b of FIG. 4B, with like-numbered elements configured in the same way, except as described differently below. The laminate 500-b includes the third film 540-1b, which is an outer film joined to the outward facing crests of the corrugations of the first film 510-b and also joined to the uncorrugated portions 508-1a and 508-2a of the first film 510-a; the third film 540-1b can be joined to the first film 510-b directly or indirectly in any way described herein and/or known in the art. The laminate 500-b includes the fourth film 540-2b, which is an outer film joined to the outward facing crests of the corrugations of the second film 520-b and also joined to the uncorrugated portions 508-1a and 508-2a of the second film 520-a; the fourth film 540-2b can be joined to the second film 520-b directly or indirectly in any way described herein and/or known in the art. In alternative embodiments, the laminate 500-a can be modified in any of the ways that the laminate 500-a of FIG. 5A can be modified.

FIG. 6A illustrates an enlarged end view of a laminate 600-a formed by a first substrate, which is a first film 610-a, and a second substrate, which is a second film 620-a. The laminate 600-a of FIG. 6A is configured in the same way as the laminate 400-a of FIG. 4A, with like-numbered elements configured in the same way, except as described differently below. The first transitions 617-1a and 627-1a are adjacent to each other, so, in the uncorrugated portion 608-1a, the first film 610-a and the second film 620-a are adjacent to each other, are in contact with each other, and are directly or indirectly joined to each other; the second transitions 617-2a and 627-2a are also adjacent to each other and in contact with each other, so, in the uncorrugated portion 608-2a, the first film 610-a and the second film 620-a are adjacent to each other, are in contact with each other, and are directly or indirectly joined to each other. In any embodiment of laminate disclosed herein, in the uncorrugated portions, the first substrate and the second substrate can be joined together in any convenient way (e.g. directly connected by adhesive at one or more locations); however, in various embodiments, the first substrate and the second substrate may be proximate to each other and/or not in contact with each other and/or not joined to each other at one or more locations in the uncorrugated portions. In alternative embodiments, the laminate 600-a can be modified in any of the ways that the laminate 400-a of FIG. 4A can be modified.

FIG. 6B illustrates an enlarged end view of a laminate 600-b formed by a first substrate, which is a first film 610-b and a second substrate, which is a second film 620-b. The laminate 600-b of FIG. 6B is configured in the same way as the laminate 600-a of FIG. 6A, with like-numbered elements configured in the same way, except that the first film 610-b and the second film 620-b are directly connected at a plurality of attachment areas 605-b, which are relatively wider (across the page) than the attachment areas 605-a of the laminate 600-a. In alternative embodiments, the laminate 600-b can be modified in any of the ways that the laminate 600-a of FIG. 6A can be modified.

Figure 7A:
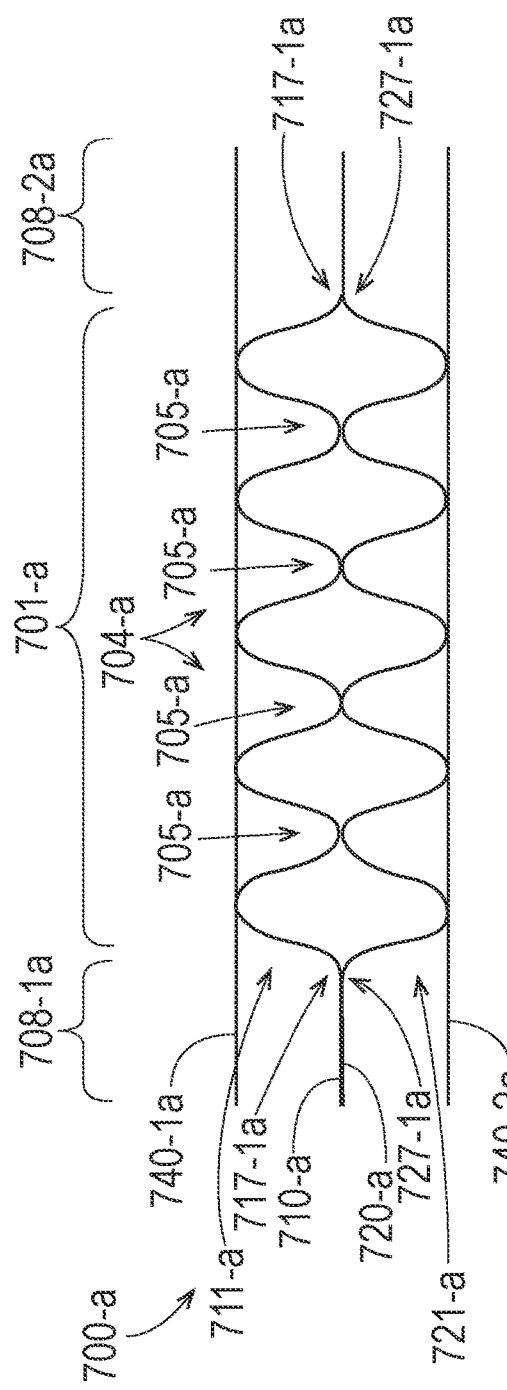
FIG. 7A illustrates an enlarged end view of a modified version of the laminate of FIG. 6A, with outer films joined to the first and second films.

FIG. 7A illustrates an enlarged end view of a laminate 700-a formed by a first substrate, which is a first film 710-a, a second substrate, which is a second film 720-a, a third substrate, which is a third film 740-1a, and a fourth substrate, which is a fourth film 740-2a. The laminate 700-a of FIG. 7A is configured in the same way as the laminate 600-a of FIG. 6A, with like-numbered elements configured in the same way, except that the laminate 700-a includes the third film 740-1a, which is an outer film joined to the outward facing crests of the corrugations of the first film 710-a; the third film 740-1a can be joined to the first film 710-a directly or indirectly in any way described herein and/or known in the art. The laminate 700-*a* includes the fourth film 740-2*a*, which is an outer film joined to the outward facing crests of the corrugations of the second film 720-*a*; the fourth film 740-2*a* can be joined to the second film 720-*a* directly or indirectly in any way described herein and/or known in the art. In alternative embodiments, the laminate 700-*a* can be modified in any of the ways that the laminate 600-*a* of FIG. 6A can be modified.

Figure 7B:
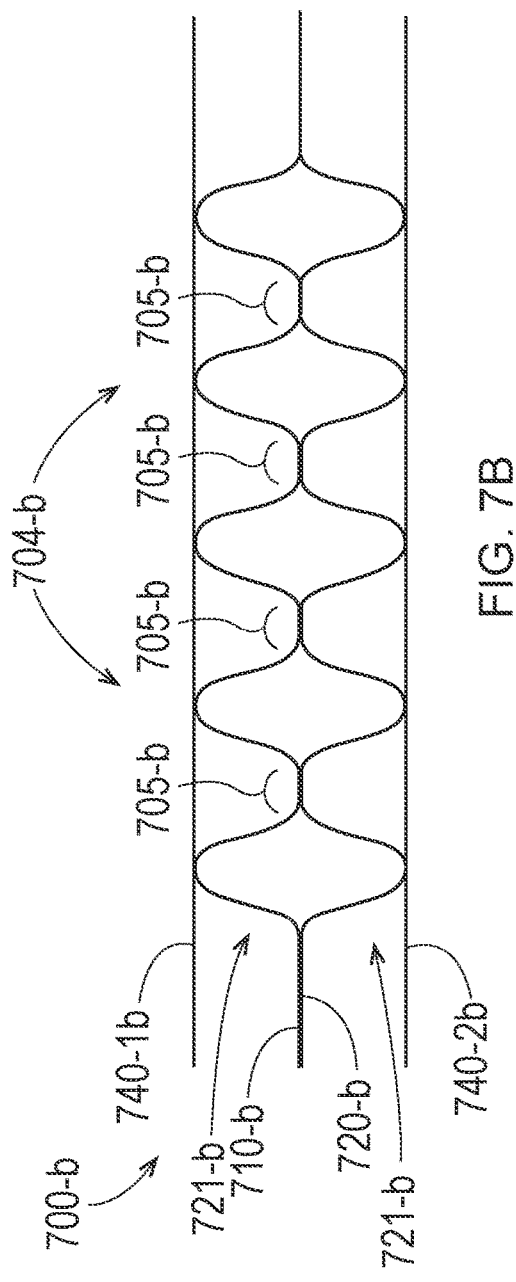
FIG. 7B illustrates an enlarged end view of a modified version of the laminate of FIG. 6B, with outer films joined to the first and second films.

FIG. 7B illustrates an enlarged end view of a laminate 700-*b* formed by a first substrate, which is a first film 710-*b*, a second substrate, which is a second film 720-*b*, a third substrate, which is a third film 740-1*b*, and a fourth substrate, which is a fourth film 740-2*b*. The laminate 700-*b* of FIG. 7B is configured in the same way as the laminate 600-*b* of FIG. 6B, with like-numbered elements configured in the same way, except as described differently below. The laminate 700-*b* includes the third film 740-1*b*, which is an outer film joined to the outward facing crests of the corrugations of the first film 710-*b* and also joined to the uncorrugated portions 708-1*a* and 708-2*a* of the first film 710-*a*; the third film 740-1*b* can be joined to the first film 710-*b* directly or indirectly in any way described herein and/or known in the art. The laminate 700-*b* includes the fourth film 740-2*b*, which is an outer film joined to the outward facing crests of the corrugations of the second film 720-*b* and also joined to the uncorrugated portions 708-1*a* and 708-2*a* of the second film 720-*a*; the fourth film 740-2*b* can be joined to the second film 720-*b* directly or indirectly in any way described herein and/or known in the art. In alternative embodiments, the laminate 700-*a* can be modified in any of the ways that the laminate 700-*a* of FIG. 7A can be modified.

For any of the laminates disclosed herein, the corrugations can have any convenient sizes and proportions, including any of the following. Any of the corrugations can have a wavelength of 0.5-5 millimeters, or any value between 0.5 and 5 millimeters in increments of 0.5 millimeters, or any range formed by any of these values, such as 1-4 millimeters, 1-3 millimeters, 1-2 millimeters, etc. Any of the corrugations can have an amplitude of 0.1-10 millimeters, or any value between 0.1 and 10 millimeters in increments of 0.1 millimeters, or any range formed by any of these values, such as 0.1-5 millimeters, 1-4 millimeters, 1-2 millimeters, etc. Any of the corrugations can have a ratio of amplitude to wavelength that is from 0.2 to 10 or any value in increments of 0.1 between 0.2 and 10, or any range formed by any of these values, such as 0.5-7.5, 0.7-5, 1-3, etc. Any of the attachment areas between corrugations can have an overall width of 0.1-5 millimeters, or any value between 0.1 and 5 millimeters in increments of 0.1 millimeters, or any range formed by any of these values, such as 0.1-3 millimeters, 0.2-1 millimeters, 0.2-0.5 millimeters, etc. Any of the corrugations can have a ratio of wavelength to overall width of an attachment area that is from 1.1 to 100 or any value in increments of 0.1 between 1 and 100, or any range formed by any of these values, such as 1-80, 5-65, 25-50, etc. Any of the corrugations can have an overall length of 1-10,000 millimeters, or any integer value between 1 and 10,000 millimeters, or any range formed by any of these values, such as 1-1,000 millimeters, 1-100 millimeters, 2-60 millimeters, 3-50 millimeters, 4-40 millimeters, 5-30 millimeters, etc.

Any of the tip bonded formed laminates disclosed herein can be made from substrates (e.g. films) of various chemistries, including one or more of any kind of polymeric material such as polyethylene (e.g. Linear low density PE, Low Density PE, and High Density PE), polypropylene, nylon, ethyl vinyl acetate, and/or any other polymer suitable for making substrates, along with any additives (e.g. pigments/colorants) and/or modifiers (e.g. titanium dioxide) known in the art of substrate-making, in any combination (e.g. homopolymers, copolymers, blends, etc.) and in any form (e.g. single layers, laminates, layered structures, coextrusions, etc.) made by any kind of substrate-making process. Any of the tip bonded formed laminates disclosed herein can be made from substrates of various thicknesses, such substrates having an overall thickness of 5-250 microns (0.2-10 mils), or any integer value between 5 and 250 microns, or any range formed by any of these values, such as 5-100 microns (0.2-3.9 mils), 10-50 microns (0.39-2 mils), 10-30 microns (0.39-1.4 mils), etc.

For any of the laminates disclosed herein, the first substrate, the second substrate (as well as either or both outer substrates, if present), may be the same or may be different in any way known in the art; for example, such differences may include differences in color, opacity, thickness, mechanical properties (e.g. elasticity, inelasticity, extensibility, inextensibility, ductility or brittleness, puncture resistance, etc.), polymeric type, presence of additives, use of modifiers, etc., in any workable combination.

Figure 8:
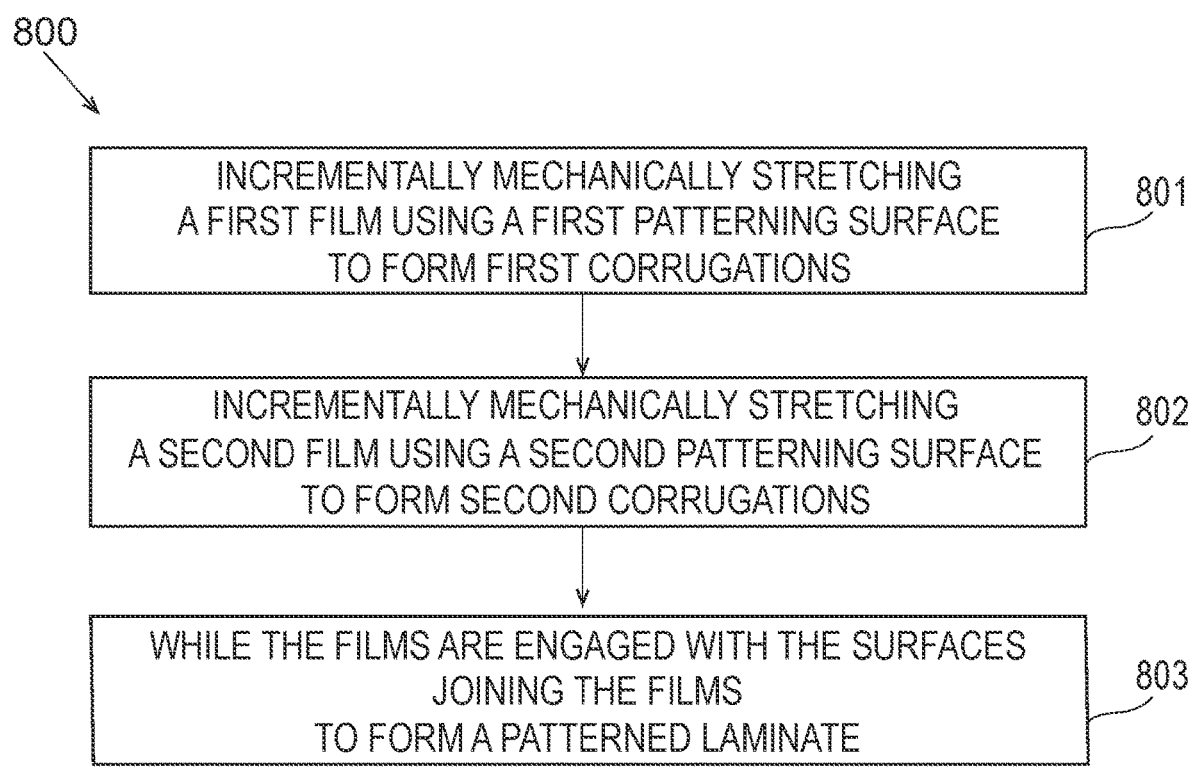
FIG. 8 shows a flow diagram for methods of making a laminate with patterned areas.

FIG. 8 shows a flow diagram 800 for methods of making a laminate with patterned areas, as described herein. The method 800 includes a first step 801 of incrementally mechanically stretching a first substrate using a first patterning surface to form first corrugations. The method 800 includes a second step 802 of incrementally mechanically stretching a second substrate using a second patterning surface to form second corrugations. The method 800 includes a third step 803, performed while the first substrate is engaged with the first patterning surface and while the second substrate is engaged with the second patterning surface, wherein the third step 803 includes directly connecting the corrugations of the first substrate to the corrugations of the second substrate to form the tip bonded formed laminate.

Figure 9:
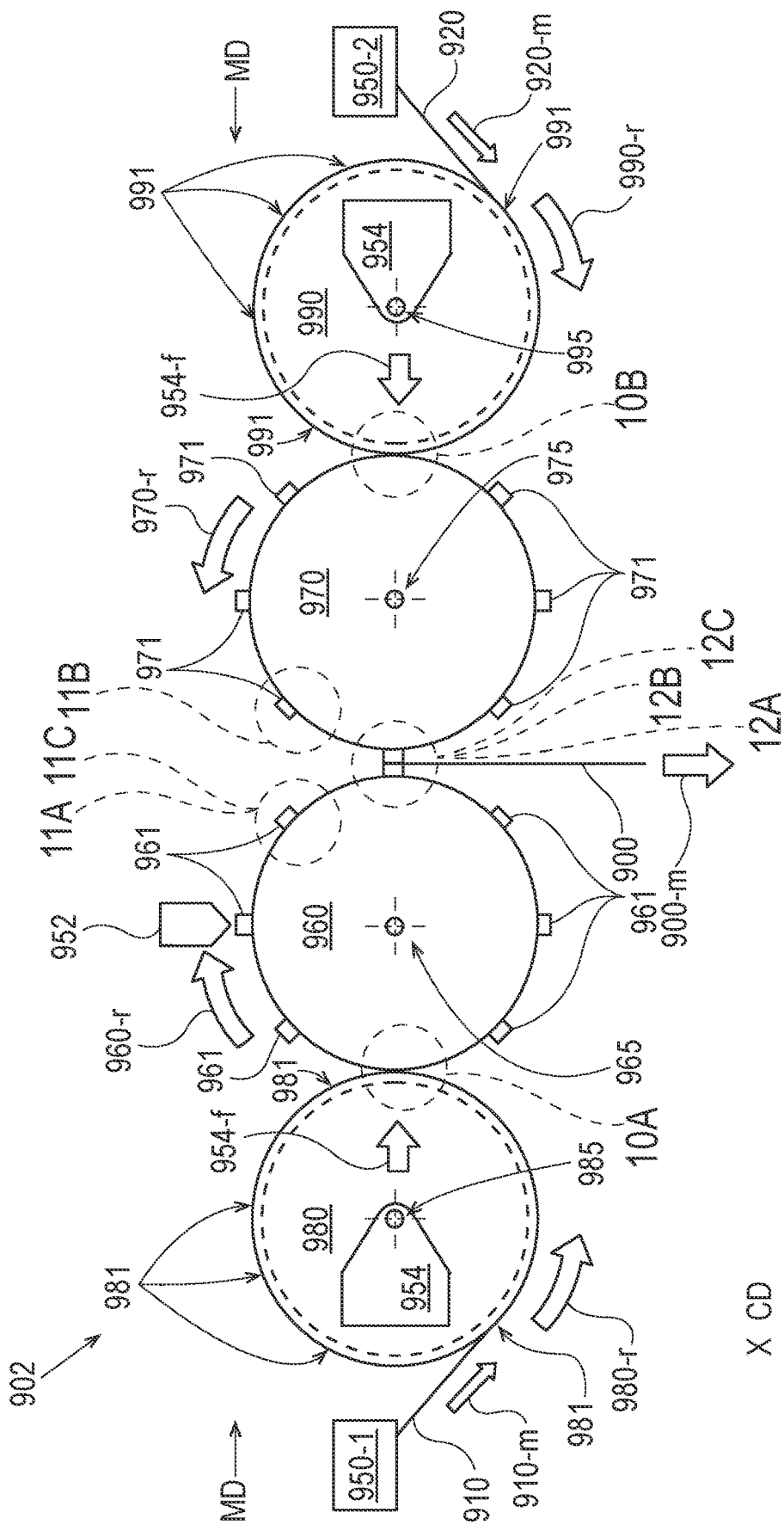
FIG. 9 is an assembly diagram illustrating a machine with four patterning rolls having protrusions oriented in the machine direction, for incrementally stretching first and second substrates and for joining the substrates together to form a tip bonded formed laminate with offset uncorrugated portions.
Figure 13:
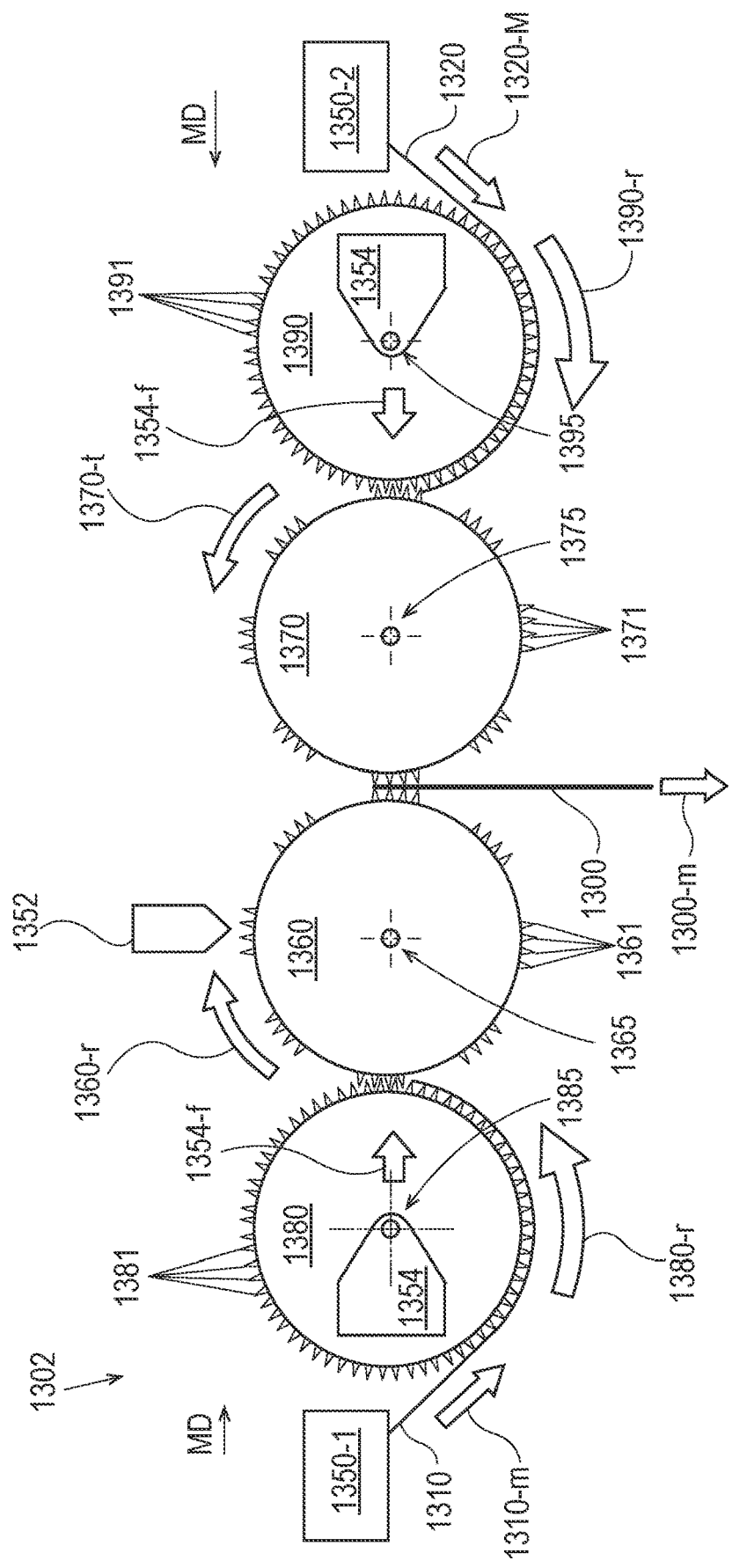
FIG. 13 is an assembly diagram illustrating a machine with four patterning rolls having protrusions oriented in the cross direction, for incrementally stretching first and second substrates and for joining the substrates together to form a tip bonded formed laminate with offset uncorrugated portions.
Figure 14:
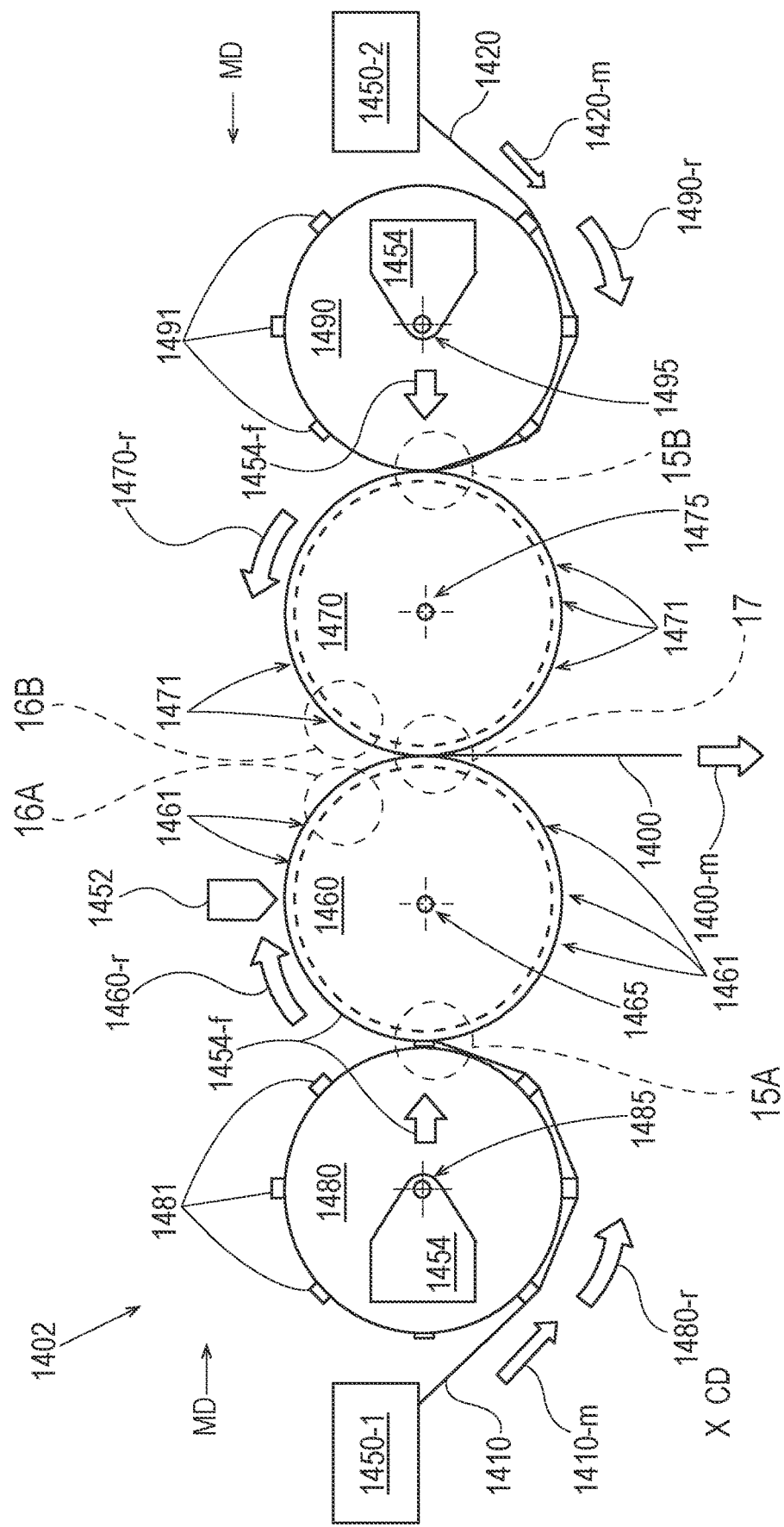
FIG. 14 is an assembly diagram illustrating a machine with four patterning rolls having protrusions oriented in the machine direction, for incrementally stretching first and second substrates and for joining the substrates together to form a tip bonded formed laminate with adjacent uncorrugated portions.
Figure 18:
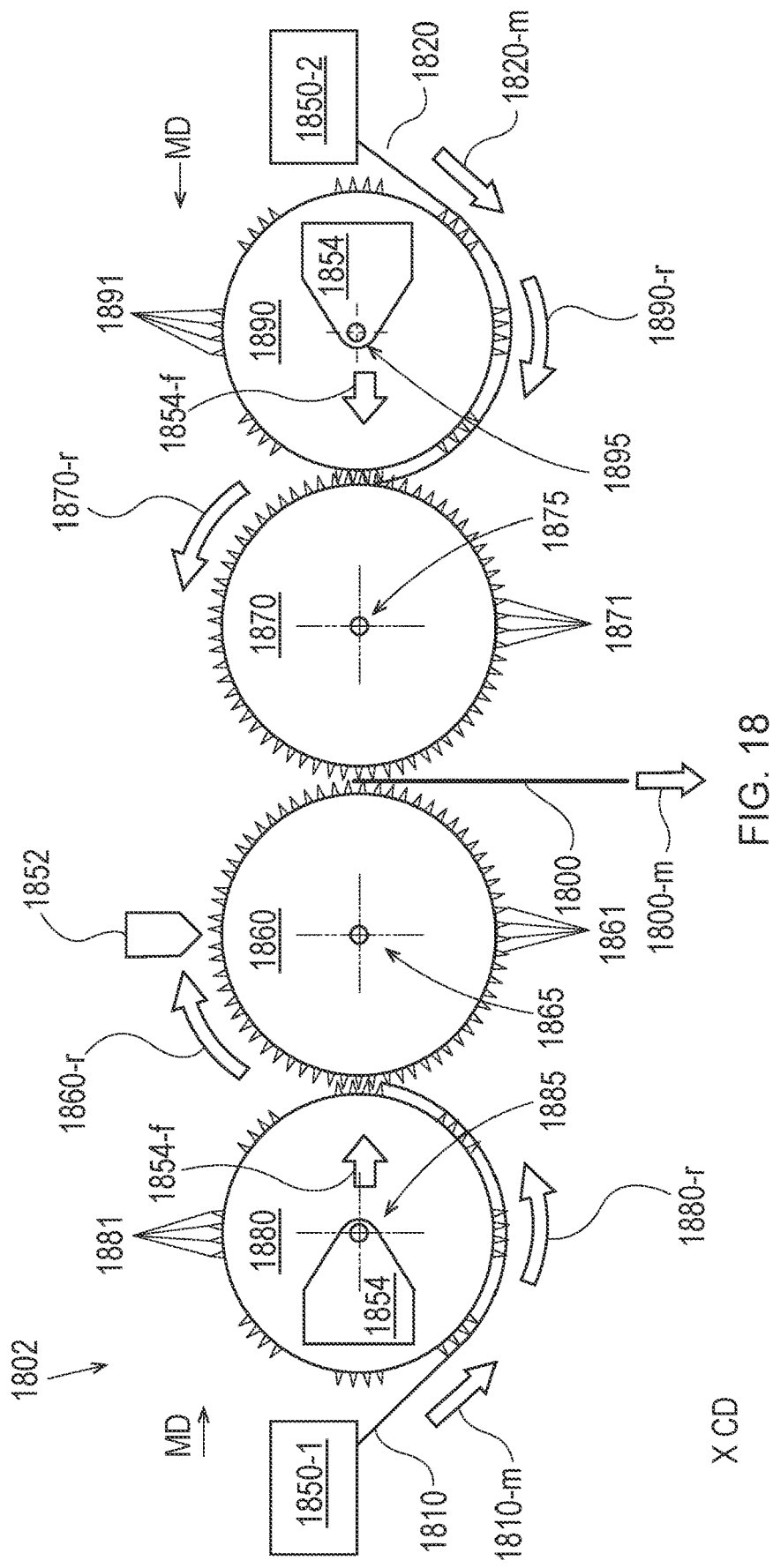
FIG. 18 is an assembly diagram illustrating a machine with four patterning rolls having protrusions oriented in the cross direction, for incrementally stretching first and second substrates and for joining the substrates together to form a tip bonded formed laminate with adjacent uncorrugated portions.

The incremental stretching and joining of the substrates in the method 800 can be performed using the machine 902 of FIG. 9, the machine 1302 of FIG. 13, the machine 1402 of FIG. 14, the machine 1802 of FIG. 18, or any alternative machine embodiment disclosed herein. The laminate resulting from the method 800 can be configured according to any laminate described herein, such as the laminate 400-*a* of FIG. 4A, the laminate 400-*b* of FIG. 4B, the laminate 400-*c* of FIG. 4C, the laminate 400-*d* of FIG. 4D, the laminate 600-*a* of FIG. 6A, the laminate 600-*b* of FIG. 6B, the laminate 600-*c* of FIG. 6C, the laminate 600-*d* of FIG. 6D, or any alternative embodiment of any of these, as disclosed herein. In various alternative embodiments, the process 800 can be modified by the additional process steps of adding one or two outer substrates, to form the laminate 500-*a* of FIG. 5A, the laminate 500-*b* of FIG. 5B, the laminate 500-*c* of FIG. 5C, the laminate 500-*d* of FIG. 5D, the laminate 700-*a* of FIG. 7A, the laminate 700-*b* of FIG. 7B, the laminate 700-*c* of FIG. 7C, or the laminate 700-*d* of FIG. 7D.

FIGS. 9-18 illustrate machines for incrementally stretching and joining substrates to form tip bonded formed laminates, as described herein. In FIGS. 9-18, the substrates are films.

FIG. 9 is an assembly diagram illustrating a machine 902 with four solid state formation rolls, which are a first patterning roll 960, a second patterning roll 970, a third patterning roll 980, and a fourth patterning roll 990, wherein the machine incrementally stretches a first substrate 910 and a second substrate 920 and joins the substrates together to form a tip bonded formed laminate 900. The first and third patterning rolls 960 and 980 incrementally stretch the first substrate 910; the second and fourth patterning rolls 970 and 990 incrementally stretch the second substrate 920. While the first substrate 910 is engaged with the first patterning roll 960 and while the second substrate 920 is engaged with the second patterning roll 970, the first and second patterning rolls 960 and 970 join together the first and second substrates 910 and 920 to form the laminate 900. In FIG. 9, the overall machine direction for the first substrate 910 is shown on the left as an arrow pointing to the right and the overall machine direction for the second substrate 920 is shown on the right as an arrow pointing to the left; however, for each of these substrates, the precise machine direction at any particular point is defined by the path of the substrate as it travels through the machine.

The first patterning roll 960 is a solid state formation roll with discrete protrusions that rotates 960-r clockwise around an axis 965 oriented in the cross direction. The first patterning roll 960 has a roll face with a cylindrical base and a plurality of rigid, elongated, discrete protrusions 961 attached to the base as radial projections. The protrusions 961 are like rows of teeth, and, on the roll 960, are disposed linearly, in parallel, side-by-side, with adjacent teeth separated by gaps. Each of the protrusions 961 is elongated since it has an overall length that is greater than its overall width. And, each of the protrusions 961 is oriented lengthwise in the machine direction, such that its overall length is parallel with the rotation of the roll 960. Each of the protrusions 961 is discrete with an overall length that does not continue all the way around the roll face of the roll 960. Each of the protrusions 961 has a distal end that forms a tip, which is the part of the protrusion that is farthest from the axis 965. The second patterning roll 970 is also a solid state formation roll with discrete protrusions 971, and is configured in the same way as the first patterning roll 960, except that the roll 970 rotates 970-r counterclockwise around an axis 975 oriented in the cross direction.

The first patterning roll 960 is positioned with respect to the second patterning roll 970 such that, as the rolls rotate, the tips of the protrusions 961 are always unmated with the tips of the protrusions 971; that is, when the tips of the protrusions 961 and 971 pass by each other, the tips of the protrusions 961 are never closer to the axis 975 than the tips of the protrusions 971 and the tips of the protrusions 971 are never closer to the axis 965 than the tips of the protrusions 961. As a result, there is no intermeshing of the protrusions 961 and 971, as the rolls 960 and 970 rotate; so, the rolls 960 and 970 are unmated, with respect to each other.

The first patterning roll 960 is also positioned with respect to the second patterning roll 970 such that, as the rolls rotate, while the first substrate 910 is engaged with the first patterning roll 960 and while the second substrate 920 is engaged with the second patterning roll 970, the tips of the protrusions 961 come within joining proximity of the tips of the protrusions 971; that is, when the tips of the protrusions 961 pass by the tips of the protrusions 971, a substrate engaged with the protrusions 961 can be directly connected to a substrate engaged with the protrusions 971. As a result, the rolls 960 and 970 can join substrates to form a laminate, as they rotate; so, the rolls 960 and 970 are joining rolls with respect to each other.

The first patterning roll 960 is registered with the second patterning roll 970 in both the machine direction and the cross direction, to enable the connection of the substrates 910 and 920. The registration in the machine direction includes controlling the relative angular positions of the rolls 960 and 970, such that, as the rolls 960 and 970 rotate, the tips of the protrusions 961 and 971 pass by each other in joining proximity, so the opposing tips of the protrusions can position corrugations from the first substrate 910 with corrugations from the second substrate 920 along their overall lengths, to form direct connections, as described and illustrated in connection with FIG. 12B. The registration in the cross direction includes positioning the roll faces of the rolls 960 and 970, such that, as the rolls 960 and 970 rotate, when the tips of the protrusions 961 are in joining proximity with the tips of the protrusions 971, the tips are aligned in the cross direction opposite from each other, so the opposing tips can position corrugations from the first substrate 910 with corrugations from the second substrate 920 across their widths, to form direct connections, as described and illustrated in connection with FIG. 12A.

The third patterning roll 980 is a ring-roll that rotates 980-r counterclockwise around an axis 985 oriented in the cross direction. The third patterning roll 980 has a roll face with a cylindrical base and a plurality of rigid, elongated, continuous protrusions 981 attached to the base as radial projections. The protrusions 981 are like rows of rings, and are disposed linearly, in parallel, side-by-side, with adjacent rings separated by gaps. Each of the rings 981 is elongated since it has an overall length that is greater than its overall width. And, each of the protrusions 981 is oriented lengthwise in the machine direction, such that its overall length is parallel with the rotation of the roll 980. Each of the protrusions 981 is continuous with an overall length that continues all the way around the roll face of the roll 980. Each of the protrusions 981 has a distal outer surface that forms a tip, which is the part of the protrusion that is farthest from the axis 995. The fourth patterning roll 990 is also a ring-roll with protrusions 991, and is configured in the same way as the third patterning roll 980, except that the roll 990 rotates 980-r clockwise around an axis 995 oriented in the cross direction.

The third patterning roll 980 is positioned with respect to the first patterning roll 960 such that, as the rolls rotate, the tips of the continuous protrusions 981 mate with the tips of the discrete protrusions 961; that is, the tips of the protrusions 961 pass within the radius formed by the tips of the protrusions 981 and the tips of the protrusions 981 pass within the radius formed by the tips of the protrusions 961. As a result, there is an intermeshing of the protrusions 961 and 981 as the rolls 960 and 980 rotate; so, the rolls 960 and 980 are mated, with respect to each other.

The third patterning roll 980 is registered with the first patterning roll 960 in the cross direction, to enable the incremental stretching of the substrate 910. The registration in the cross direction includes positioning the roll faces of the rolls 960 and 980, such that, as the rolls 960 and 980 rotate, the tips of the continuous protrusions 981 are offset in the cross direction from the tips of the discrete protrusions 961, so the tips can intermesh to form incrementally stretched corrugations in the first substrate 910, as described and illustrated in connection with FIG. 10A. Since the protrusions 981 are continuous, there is no need to register the third patterning roll 980 with the first patterning roll 960 in the machine direction.

The fourth patterning roll 990 is positioned and registered with the second patterning roll 970 in the same way that the third patterning roll 980 is positioned and registered with the first patterning roll 960, such that, the rolls 990 and 970 are mated, with respect to each other, and the tips of the continuous protrusions 991 intermesh with the tips of the discrete protrusions 971, to form incrementally stretched corrugations in the second substrate 920, as described and illustrated in connection with FIG. 10B. Since the protrusions 991 are continuous, there is no need to register the fourth patterning roll 990 with the second patterning roll 970 in the machine direction.

The machine 902 also includes several additional apparatuses. A first web supply apparatus 950-1 is positioned upstream from the third patterning roll 980, and supplies the first substrate 910 in the form of a web; a web supply apparatus can take any convenient form, such as an unwind stand. Similarly, a second web supply apparatus 950-2 is positioned upstream from the fourth patterning roll 990, and supplies the second substrate 920 in the form of a web. An adhesive application apparatus 952 is positioned adjacent to the first patterning roll 960 and applies adhesive to a substrate engaged with the protrusions 961 of the roll 960; an adhesive application apparatus can take any convenient form, such as a glue head with a comb shim, a gravure print roll, an inkjet printer, etc. A force application apparatus 954 includes a first part that pushes and holds the third patterning roll 980 into mating relation with the first patterning roll 960 and a second part that pushes and holds the fourth patterning roll 990 into mating relation with the second patterning roll 970; a force application apparatus can take any convenient form, such as air cylinders that move the rolls' rotating axes.

The first substrate 910 generally moves through the machine 902 from left to right, as indicated by its overall machine direction. The first substrate 910 moves 910-m from the first web supply apparatus 950-1 onto the third patterning roll 980, then between the intermeshing protrusions 961 and 981 of the mated rolls 960 and 980, then past the adhesive application apparatus 952, and then into the joining proximity between the protrusions 961 and 971 of the rolls 960 and 970. As the first substrate 910 is supplied by the first web supply apparatus 950-1, the first substrate 910 has the form of a substantially flat, unformed, continuous web. The first substrate 910 moves 910-m from the first web supply apparatus 950-1 and follows the roll face of the third patterning roll 980. As the third patterning roll 980 rotates, the first substrate 910 moves into and engages with the intermeshing protrusions 981 and 961 of the patterning rolls 980 and 960, which incrementally mechanically stretch the first substrate 910 to form a plurality of corrugations with troughs and crests, as described and illustrated in connection with FIG. 10A. As the patterning rolls 980 and 960 rotate, the first substrate 910 moves out of the intermeshing protrusions 961 and 981 and disengages from the protrusions 981 of the third patterning roll 980 but remains engaged with the protrusions 961 of the first patterning roll 960 and follows the roll face of the first patterning roll 960. As the first patterning roll 960 rotates farther, the first substrate 910 continues to follow the roll face of the first patterning roll 960, remaining engaged with the protrusions 961, and moving past the adhesive application apparatus 952, which applies adhesive to the troughs of the corrugations of the first substrate 910, as described and illustrated in connection with FIGS. 11A and 11C. The adhesive application apparatus 952 can be positioned adjacent to the first patterning roll 960 at any convenient location downstream from the disengagement of the first and third rolls 960 and 980 and upstream from the joining proximity of the first and second rolls 960 and 970. In alternative embodiments, another adhesive application apparatus (in addition to or instead of the adhesive application apparatus 952) can be adjacent to the second patterning roll 970 at any convenient location downstream from the disengagement of the second and fourth rolls 970 and 990 and upstream from the joining proximity of the first and second rolls 960 and 970. As the first patterning roll 960 rotates even farther, the first substrate 910 continues to follow the roll face of the first patterning roll 960, remaining engaged with the protrusions 961, and moving between the patterning rolls 960 and 970.

The second substrate 920 generally moves through the machine 902 from right to left, as indicated by its overall machine direction. The second substrate 920 moves 920-m from the second web supply apparatus 950-2 onto the fourth patterning roll 990, then between the intermeshing protrusions 971 and 991 of the mated rolls 970 and 990, and then into the joining proximity between the protrusions 971 and 991 of the rolls 970 and 990. As the second substrate 920 is supplied by the second web supply apparatus 950-2, the second substrate 920 has the form of a substantially flat, unformed, continuous web. The second substrate 920 moves 920-m from the second web supply apparatus 950-2 and follows the roll face of the fourth patterning roll 990. As the fourth patterning roll 990 rotates, the second substrate 920 moves into and engages with the intermeshing protrusions 991 and 971 of the patterning rolls 990 and 970, which incrementally mechanically stretch the second substrate 920 to form a plurality of corrugations with troughs and crests, as described and illustrated in connection with FIG. 10B. As the patterning rolls 990 and 970 rotate, the second substrate 920 moves out of the intermeshing protrusions 991 and 971 and disengages from the protrusions 991 of the fourth patterning roll 990 but remains engaged with the protrusions 971 of the second patterning roll 970 and follows the roll face of the second patterning roll 970. As the second patterning roll 970 rotates farther, the second substrate 920 continues to follow the roll face of the second patterning roll 970, remaining engaged with the protrusions 971, as described and illustrated in connection with FIG. 11B. As the second patterning roll 970 rotates even farther, the second substrate 920 continues to follow the roll face of the second patterning roll 970, remaining engaged with the protrusions 971, and moving between the patterning rolls 970 and 960.

As the first patterning roll 960 and the second patterning roll 970 rotate farther, the first substrate 910 is engaged with the first patterning roll 960, the second substrate 920 is engaged with the second patterning roll 970, and the tips 962 of the protrusions 961 of the first patterning roll 960 come into joining proximity with the tips 972 of the protrusions 971 of the second patterning roll 970, such that the troughs 912 of the corrugations 911 from the first substrate 910 become connected by the adhesive to the troughs 922 of the corrugations 921 from the second substrate 920, to form the tip bonded formed laminate 900, which moves 900-m off of the rolls 960 and 970 in its finished form.

In various modified embodiments, one or more additional intermediate substrates (e.g. films), can be fed in between a first substrate and a second substrate at the joining proximity, such that the first substrate, the intermediate substrate(s), and the second substrate can all be joined together by the first patterning roll and the second patterning roll, with the intermediate substrate(s) disposed in between, according to embodiments disclosed herein; this approach can be used to modify any embodiments of process and equipment disclosed in FIGS. 8-17, including any alternative embodiments.

FIG. 10A illustrates an enlarged partial cross-section view of a portion 1003-a of the machine 902 of FIG. 9, showing the protrusions 961 of the first patterning roll 960 intermeshing with the protrusions 981 of the third patterning roll 980 to incrementally stretch the first substrate 910, and form a plurality of corrugations 911. On the left and right sides of the portion 1003-*a* where there are no protrusions of the first patterning roll 960 intermeshing with the protrusions 981 of the third patterning roll 980, uncorrugated portions of the first substrate 910 lie on top of the protrusions 981, at about the same height as the crests of the corrugations 911.

FIG. 10B illustrates an enlarged partial cross-section view of a portion 1003-*b* of the machine 902 of FIG. 9, showing the protrusions 971 of the second patterning roll 970 intermeshing with the protrusions 991 of the fourth patterning roll 990 to incrementally stretch the second substrate 920, and form a plurality of corrugations 921. On the left and right sides of the portion 1003-*b* where there are no protrusions of the second patterning roll 970 intermeshing with the protrusions 991 of the fourth patterning roll 990, uncorrugated portions of the second substrate 920 lie on top of the protrusions 991, at about the same height as the crests of the corrugations 921.

Figure 11A:
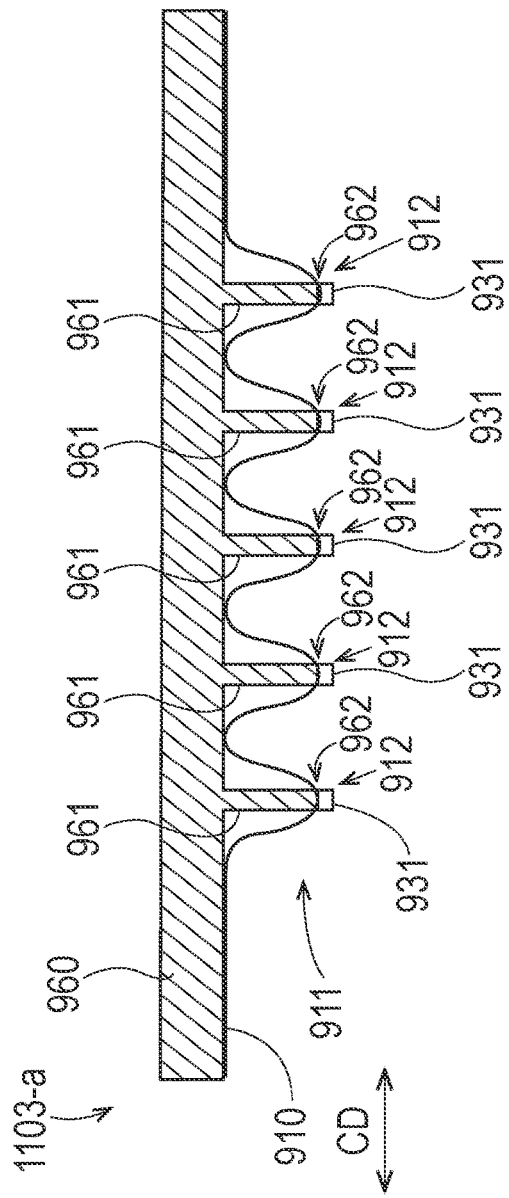
FIG. 11A illustrates an enlarged partial cross-sectional view of the first substrate engaged with the first patterning roll from the machine of FIG. 9, wherein an adhesive is applied to troughs of corrugations of the first substrate.

FIG. 11A illustrates an enlarged partial cross-sectional view of a portion 1103-*a* of the machine 902 of FIG. 9, at a location downstream from the portion 1003-*a* of FIG. 10A, showing the corrugations 911 of the first substrate 910 engaged with the protrusions 961 of the first patterning roll 960, wherein the troughs 912 of the corrugations 911 are disposed on tips 962 of the protrusions 961 and an adhesive 931 is selectively applied to the troughs 912. In FIG. 11A, the uncorrugated portions of the first substrate 910 are in the same positions as in FIG. 10A.

Figure 11B:
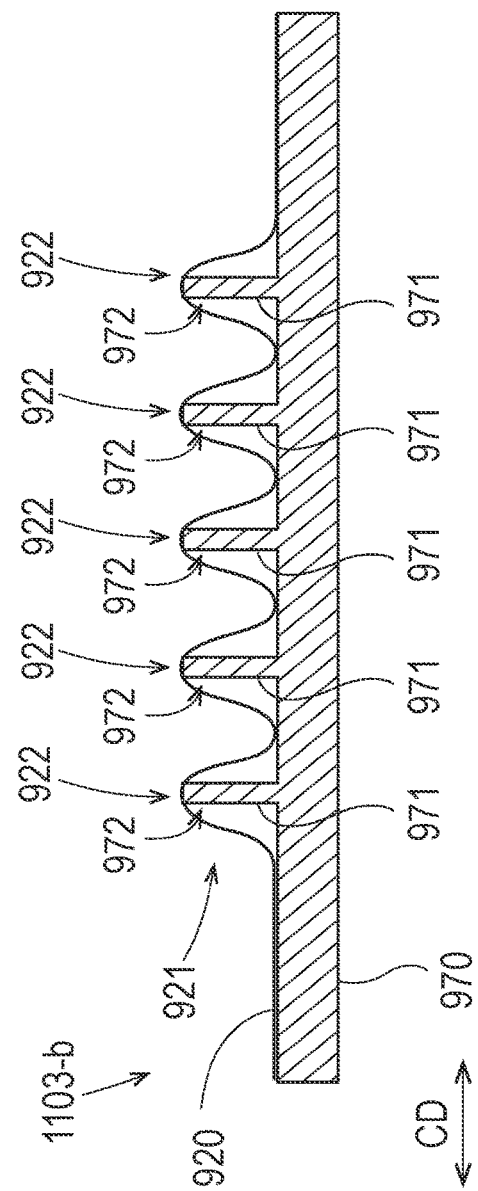
FIG. 11B illustrates an enlarged partial cross-sectional view of the second substrate engaged with the second patterning roll from the machine of FIG. 9.

FIG. 11B illustrates an enlarged partial cross-sectional view of a portion 1103-*b* of the machine 902 of FIG. 9, at a location downstream from the portion 1003-*b* of FIG. 10B, showing the corrugations 921 of the second substrate 920 engaged with the protrusions 971 of the second patterning roll 970, wherein the troughs 922 of the corrugations 921 are disposed on tips 972 of the protrusions 971. In FIG. 11B, the uncorrugated portions of the second substrate 920 are in the same positions as in FIG. 10B.

Figure 11C:
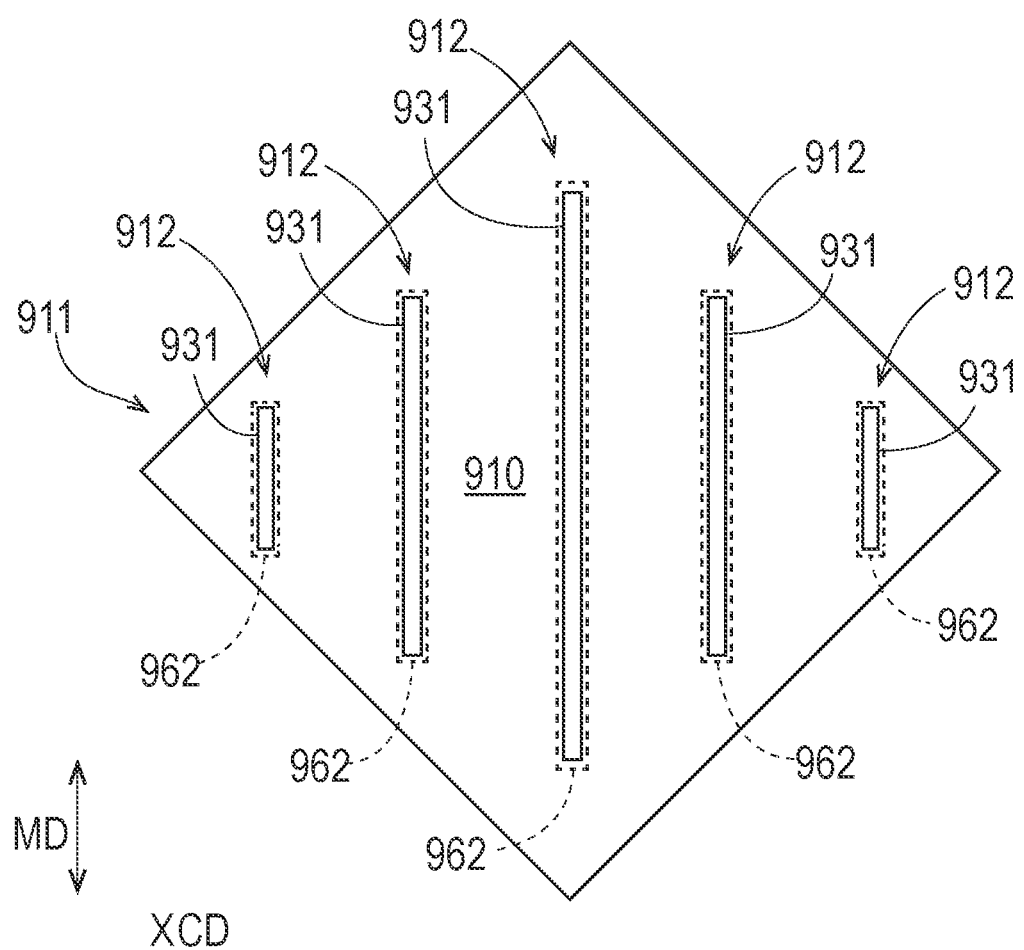
FIG. 11C illustrates a partial outside view of the first substrate of FIG. 11A.

FIG. 11C illustrates a partial outside view of the first substrate 910 (shown in broken part) of FIG. 11A engaged with the first patterning roll 960 (not shown), showing the troughs 912 of the corrugations 911 disposed on the tips 962 (shown as hidden) of the protrusions 961 and the adhesive 931 selectively applied to the troughs 912.

Figure 12A:
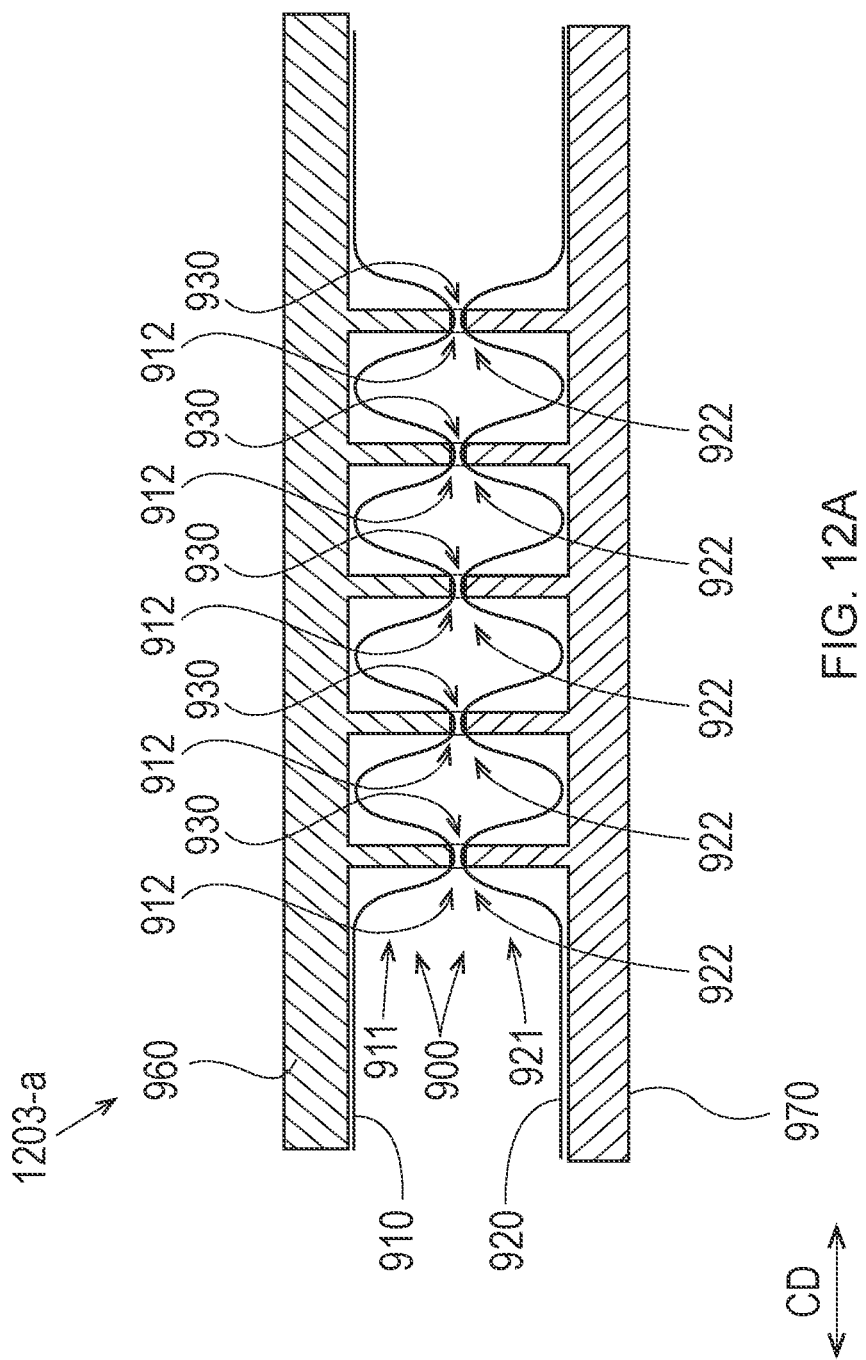
FIG. 12A illustrates an enlarged partial cross-sectional view in the machine direction of the troughs of the corrugations from the first substrate being adhesively connected to the troughs of the corrugations from the second substrate, while the substrates are engaged with patterning rolls from the machine of FIG. 9, to form the tip bonded formed laminate of FIG. 9.

FIG. 12A illustrates an enlarged partial cross-sectional view (in the machine direction) of a portion 1203-*a* of the machine 902 of FIG. 9, at a location downstream from the portions 1103-*a* of FIG. 11A and 1103-*b* of FIG. 11B, wherein the first substrate 910 is engaged with the first patterning roll 960, the second substrate 920 is engaged with the second patterning roll 970, and the protrusions 961 of the first patterning roll 960 are in joining proximity with the protrusions 971 of the second patterning roll 970, such that the troughs 912 of the corrugations 911 from the first substrate 910 are being adhesively connected to the troughs 922 of the corrugations 921 from the second substrate 920 at a plurality of attachment areas 930, to form the tip bonded formed laminate 900 of FIG. 9.

Figure 12B:
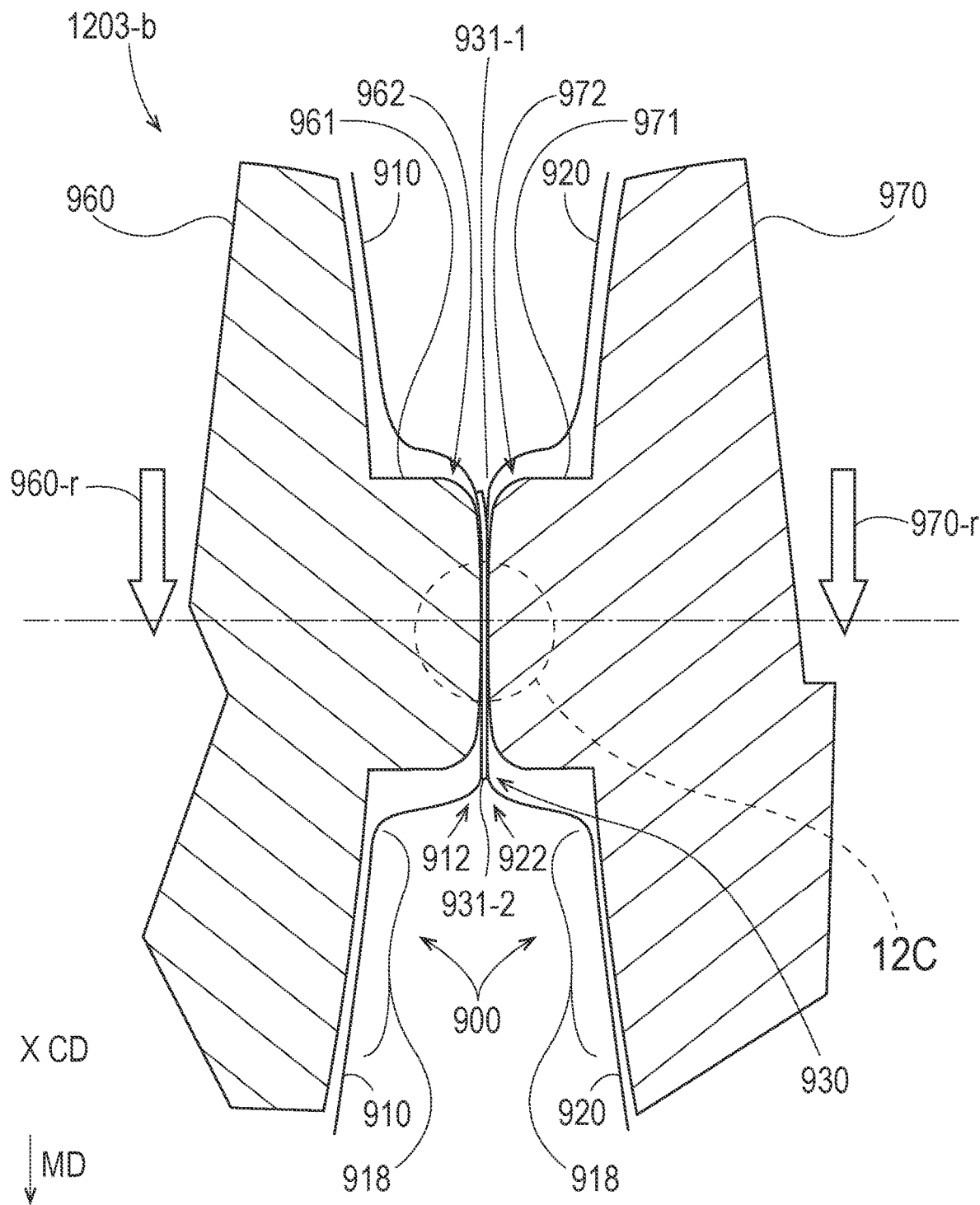
FIG. 12B illustrates an enlarged partial cross-sectional view in the cross direction of a trough of the corrugations from the first substrate being adhesively connected to a trough of the corrugations from the second substrate, while the substrates are engaged with patterning rolls from the machine of FIG. 9, to form the tip bonded formed laminate of FIG. 9.

FIG. 12B illustrates an enlarged partial cross-sectional view (in the cross direction) of the portion 1203-*a* of FIG. 12A, wherein the first substrate 910 is engaged with the first patterning roll 960, the second substrate 920 is engaged with the second patterning roll 970, and the tip 962 of one of the protrusions 961 of the first patterning roll 960 is in joining proximity with the tip 972 of one of the protrusions 971 of the second patterning roll 970, such that one of the troughs 912 of the corrugations 911 from the first substrate 910 is being connected by an adhesive 931-1 and 931-2 to one of the troughs 922 of the corrugations 921 from the second substrate 920 at an attachment area 930, to form the tip bonded formed laminate 900 of FIG. 9. A first portion of the adhesive 931-1 is an upstream portion of the adhesive and is disposed on the first substrate 910 but not yet in contact with the second substrate 920. A second portion of the adhesive 931-2 is a downstream portion of the adhesive and is contact with both the first substrate 910 and the second substrate 920.

Figure 12C:
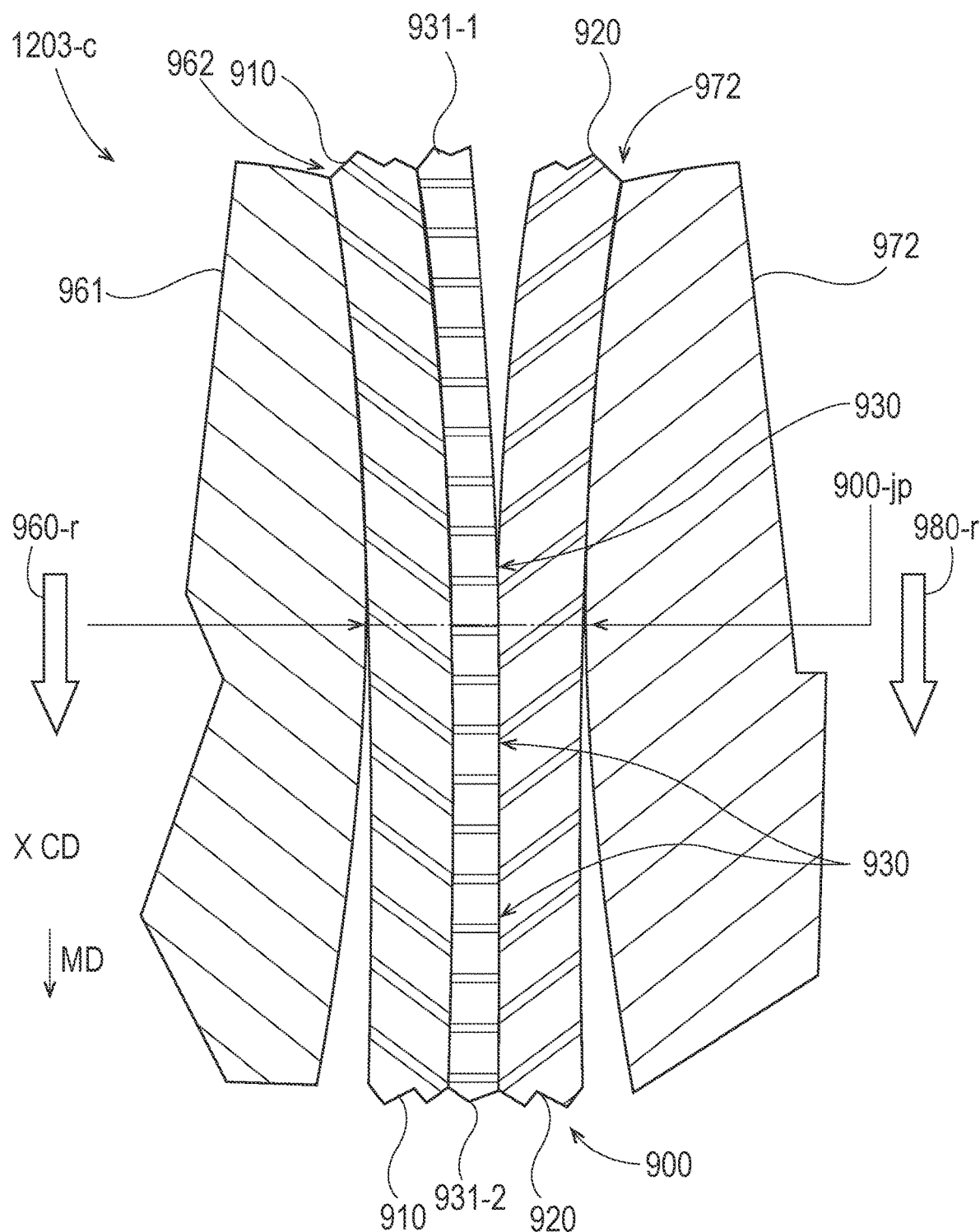
FIG. 12C illustrates a further enlarged portion of the view from FIG. 12B.

FIG. 12C illustrates a further enlarged portion of the view from FIG. 12B, wherein the first substrate 910 is engaged with the first patterning roll 960, the second substrate 920 is engaged with the second patterning roll 970, and the tip 962 of one of the protrusions 961 of the first patterning roll 960 is in joining proximity 900-*jp* with the tip 972 of one of the protrusions 971 of the second patterning roll 970. Upstream from the joining proximity 900-*jp*, the first substrate 910 is separate from the second substrate 920, and a first portion of the adhesive 931-1 is disposed on an outer portion of a trough 912 of a corrugation 911 of the first substrate 910. At the joining proximity 900-*jp*, the tips 962 and 972 pass by each other, and the adhesive comes into contact with an outer portion of a trough 922 of a corrugation 921 of the second substrate 920. Downstream from the joining proximity 900-*jp*, a second portion of the adhesive 931-2 connects the trough 912 of the first substrate 910 to the trough 922 of the second substrate 920, such that the adhesively connected substrates 910 and 920 form the tip bonded formed laminate 900 of FIG. 9.

FIG. 13 is an assembly diagram illustrating a machine 1302 with four solid state formation rolls, which are a first patterning roll 1360, a second patterning roll 1370, a third patterning roll 1380, and a fourth patterning roll 1390, wherein the machine incrementally stretches a first substrate 1310 and a second substrate 1320 and joins the substrates 1310 and 1320 together to form a tip bonded formed laminate 1300. The first and third patterning rolls 1360 and 1380 incrementally stretch the first substrate 1310; the second and fourth patterning rolls 1370 and 1390 incrementally stretch the second substrate 1320. While the first substrate 1310 is engaged with the first patterning roll 1360 and while the second substrate 1320 is engaged with the second patterning roll 1370, the first and second patterning rolls 1360 and 1370 join together the first and second substrates 1310 and 1320 to form the laminate 1300. In FIG. 13, the overall machine direction for the first substrate 1310 is shown on the left as an arrow pointing to the right and the overall machine direction for the second substrate 1320 is shown on the right as an arrow pointing to the left; however, for each of these substrates, the precise machine direction at any particular point is defined by the path of the substrate as it travels through the machine.

The machine 1302 of FIG. 13 is configured in the same way as the machine 902 of FIG. 9, with like-numbered elements configured in the same way, except as described differently below. On the first patterning roll 1360, each of the protrusions 1361 is oriented lengthwise in the cross direction, such that its overall length is parallel with the axis 1365. Each of the protrusions 1361 is discrete with an overall length that does not extend all the way across the roll face of the roll 1360. The second patterning roll 1370 includes protrusions 1371, and is configured in the same way as the first patterning roll 1360, except that the roll 1370 rotates 1370-*r* counterclockwise around an axis 1375. The rolls 1360 and 1370 are unmated joining rolls, with respect to each other, and are registered with each other in both the machine direction and the cross direction, to enable the connection of the substrates 1310 and 1320.

On the third patterning roll 1380, each of the protrusions is oriented lengthwise in the cross direction, such that its overall length is parallel with the axis 1385. Each of the protrusions 1381 is continuous with an overall length that extends all the way across the roll face of the roll 1380. The third patterning roll 1380 is mated to the first patterning roll 1360, and the third patterning roll 1380 is registered to the first patterning roll 1360 in both the machine direction and the cross direction, to enable the incremental stretching of the first substrate 1310.

The fourth patterning roll 1390 includes protrusions 1391, and is configured in the same way as the third patterning roll 1380, except that the roll 1390 rotates 1380-r clockwise around an axis 1385. The fourth patterning roll 1390 is mated to the second patterning roll 1370, and the fourth patterning roll 1390 is registered to the second patterning roll 1370 in both the machine direction and the cross direction, to enable the incremental stretching of the second substrate 1320.

In various embodiments, the machine 1302 of FIG. 13 can be configured according to any alternative machine embodiments disclosed herein, in any workable combination.

FIG. 14 is an assembly diagram illustrating a machine 1402 with four solid state formation rolls, which are a first patterning roll 1460, a second patterning roll 1470, a third patterning roll 1480, and a fourth patterning roll 1490, wherein the machine incrementally stretches a first substrate 1410 and a second substrate 1420 and joins the substrates together to form a tip bonded formed laminate 1400. The first and third patterning rolls 1460 and 1480 incrementally stretch the first substrate 1410; the second and fourth patterning rolls 1470 and 1490 incrementally stretch the second substrate 1420. While the first substrate 1410 is engaged with the first patterning roll 1460 and while the second substrate 1420 is engaged with the second patterning roll 1470, the first and second patterning rolls 1460 and 1470 join together the first and second substrates 1410 and 1420 to form the laminate 1400. In FIG. 14, the overall machine direction for the first substrate 1410 is shown on the left as an arrow pointing to the right and the overall machine direction for the second substrate 1420 is shown on the right as an arrow pointing to the left; however, for each of these substrates, the precise machine direction at any particular point is defined by the path of the substrate as it travels through the machine.

The machine 1420 of FIG. 14 is configured in the same way as the machine 902 of FIG. 9, with like-numbered elements configured in the same way, except as described differently below. The first patterning roll 1460 is a ring-roll with continuous protrusions 1461. The second patterning roll 1470 is also a ring-roll with continuous protrusions 1471. The rolls 1460 and 1470 are unmated joining rolls, with respect to each other, and are registered with each other in the cross direction, to enable the connection of the substrates 1410 and 1420. Since the protrusions 1461 and 1471 are continuous, there is no need to register the first patterning roll 1460 with the second patterning roll 1470 in the machine direction.

The third patterning roll 1480 is a solid state formation roll with discrete protrusions 1481. The third patterning roll 1480 is mated to the first patterning roll 1460, and the third patterning roll 1480 is registered to the first patterning roll 1460 in the cross direction, to enable the incremental stretching of the first substrate 1410. Since the protrusions 1461 are continuous, there is no need to register the third patterning roll 1480 with the first patterning roll 1460 in the machine direction.

The fourth patterning roll 1490 is also a solid state formation roll with discrete protrusions 1491. The fourth patterning roll 1490 is mated to the second patterning roll 1470, and the fourth patterning roll 1490 is registered to the second patterning roll 1470 in the cross direction, to enable the incremental stretching of the second substrate 1420. Since the protrusions 1471 are continuous, there is no need to register the fourth patterning roll 1490 with the second patterning roll 1470 in the machine direction.

In various embodiments, the machine 1402 of FIG. 14 can be configured according to any alternative machine embodiments disclosed herein, in any workable combination.

FIG. 15A illustrates an enlarged partial cross-section view of a portion 1503-a of the machine 1402 of FIG. 14, showing the protrusions 1461 of the first patterning roll 1460 intermeshing with the protrusions 1481 of the third patterning roll 1480 to incrementally stretch the first substrate 1410, and form a plurality of corrugations 1411. On the left and right sides of the portion 1503-a where there are no protrusions of the third patterning roll 1480 intermeshing with the protrusions 1461 of the first patterning roll 1460, uncorrugated portions of the first substrate 1410 lie on top of the protrusions 1461, at about the same height as the troughs of the corrugations 1411.

FIG. 15B illustrates an enlarged partial cross-section view of a portion 1503-b of the machine 1402 of FIG. 14, showing the protrusions 1471 of the second patterning roll 1470 intermeshing with the protrusions 1491 of the fourth patterning roll 1490 to incrementally stretch the second substrate 1420, and form a plurality of corrugations 1421. On the left and right sides of the portion 1503-b where there are no protrusions of the fourth patterning roll 1490 intermeshing with the protrusions 1471 of the second patterning roll 1470, uncorrugated portions of the second substrate 1420 lie on top of the protrusions 1471, at about the same height as the troughs of the corrugations 1421.

FIG. 16A illustrates an enlarged partial cross-sectional view of a portion 1603-a of the machine 1402 of FIG. 14, at a location downstream from the portion 1503-a of FIG. 15A, showing the corrugations 1411 of the first substrate 1410 engaged with the protrusions 1461 of the first patterning roll 1460, wherein the troughs 1412 of the corrugations 1411 are disposed on tips 1462 of the protrusions 1461 and an adhesive 1431 is selectively applied to the troughs 1412. In FIG. 16A, the uncorrugated portions of the first substrate 1410 are in the same positions as in FIG. 15A, and the uncorrugated portions of the first substrate 1410 also receive the adhesive 1431 selectively applied across their widths at locations opposite the tips 1462 of the protrusions 1461.

FIG. 16B illustrates an enlarged partial cross-sectional view of a portion 1603-b of the machine 1402 of FIG. 14, at a location downstream from the portion 1503-b of FIG. 15B, showing the corrugations 1421 of the second substrate 1420 engaged with the protrusions 1471 of the second patterning roll 1470, wherein the troughs 1422 of the corrugations 1421 are disposed on tips 1472 of the protrusions 1471. In FIG. 16B, the uncorrugated portions of the second substrate 1420 are in the same positions as in FIG. 16B.

Figure 17:
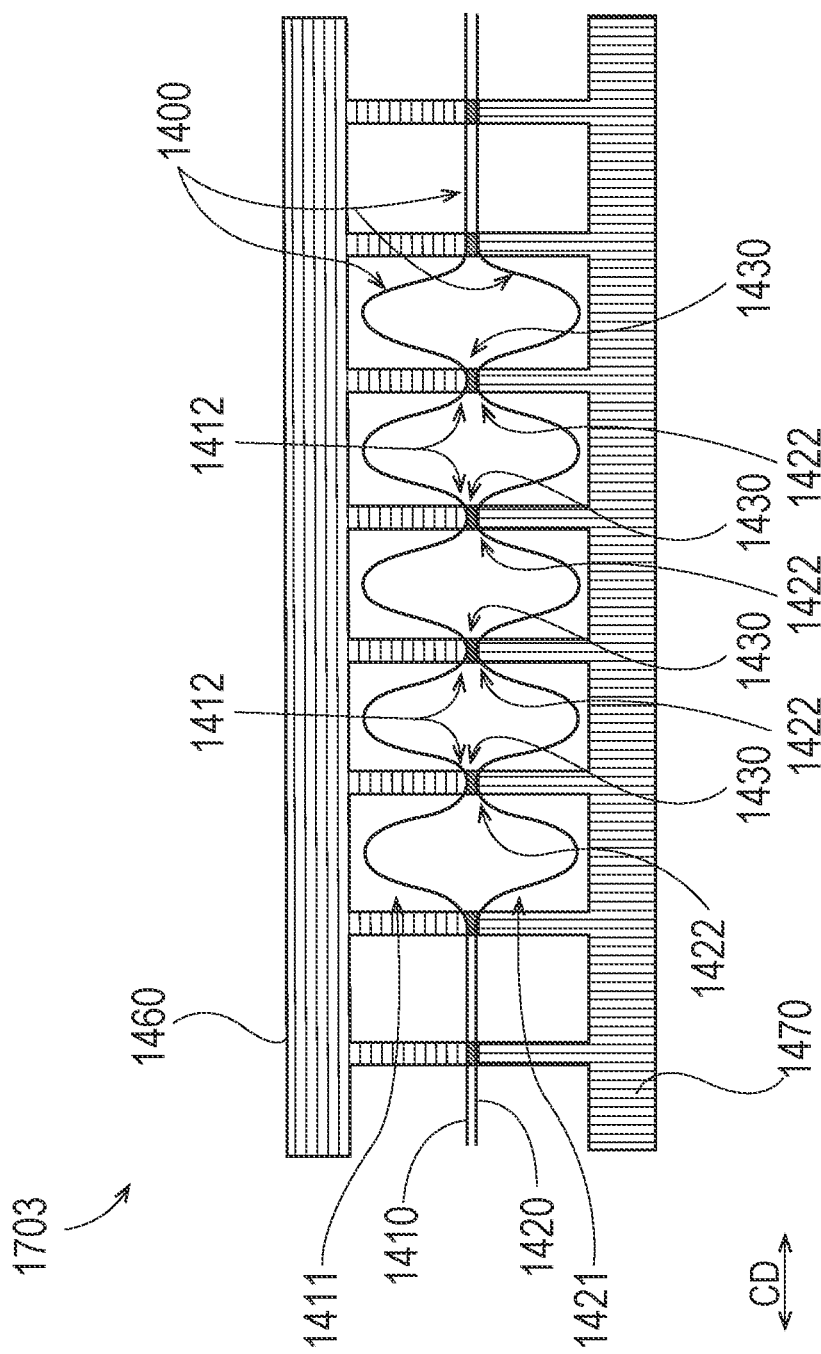
FIG. 17 illustrates an enlarged partial cross-sectional view in the machine direction of the troughs of the corrugations from the first substrate being adhesively connected to the troughs of the corrugations from the second substrate and the uncorrugated portions of the first substrate being adhesively connected to the uncorrugated portions of the second substrate, while the substrates are engaged with patterning rolls from the machine of FIG. 14, to form the tip bonded formed laminate of FIG. 14.

FIG. 17 illustrates an enlarged partial cross-sectional view (in the machine direction) of a portion 1703 of the machine 1402 of FIG. 14, at a location downstream from the portions 1603-a of FIG. 16A and 1603-b of FIG. 16B, wherein the first substrate 1410 is engaged with the first patterning roll 1460, the second substrate 1420 is engaged with the second patterning roll 1470, and the protrusions 1461 of the first patterning roll 1460 are in joining proximity with the protrusions 1471 of the second patterning roll 1470, such that the troughs 1412 of the corrugations 1411 from the first substrate 1410 are being adhesively connected to the troughs 1422 of the corrugations 1421 from the second substrate 1420 at a plurality of attachment areas 1430, and the uncorrugated portions of the first substrate 1410 are being adhesively connected to the uncorrugated portions of the second substrate 1420, to form the tip bonded formed laminate 1400 of FIG. 14.

FIG. 18 is an assembly diagram illustrating a machine 1802 with four solid state formation rolls, which are a first patterning roll 1860, a second patterning roll 1870, a third patterning roll 1880, and a fourth patterning roll 1890, wherein the machine incrementally stretches a first substrate 1810 and a second substrate 1820 and joins the substrates 1810 and 1820 together to form a tip bonded formed laminate 1800. The first and third patterning rolls 1860 and 1880 incrementally stretch the first substrate 1810; the second and fourth patterning rolls 1870 and 1890 incrementally stretch the second substrate 1820. While the first substrate 1810 is engaged with the first patterning roll 1860 and while the second substrate 1820 is engaged with the second patterning roll 1870, the first and second patterning rolls 1860 and 1870 join together the first and second substrates 1810 and 1820 to form the laminate 1800. In FIG. 18, the overall machine direction for the first substrate 1810 is shown on the left as an arrow pointing to the right and the overall machine direction for the second substrate 1820 is shown on the right as an arrow pointing to the left; however, for each of these substrates, the precise machine direction at any particular point is defined by the path of the substrate as it travels through the machine.

The machine 1802 of FIG. 18 is configured in the same way as the machine 1402 of FIG. 14, with like-numbered elements configured in the same way, except as described differently below. On the first patterning roll 1860, each of the protrusions 1861 is oriented lengthwise in the cross direction, such that its overall length is parallel with the axis 1865. Each of the protrusions 1861 is continuous with an overall length that extends all the way across the roll face of the roll 1860. The second patterning roll 1870 includes protrusions 1871, and is configured in the same way as the first patterning roll 1860, except that the roll 1870 rotates 1870-*r* counterclockwise around an axis 1875. The rolls 1860 and 1870 are unmated joining rolls, with respect to each other, and are registered with each other in both the machine direction and the cross direction, to enable the connection of the substrates 1810 and 1820.

On the third patterning roll 1880, each of the protrusions is oriented lengthwise in the cross direction, such that its overall length is parallel with the axis 1885. Each of the protrusions 1881 is discrete with an overall length that does not extend all the way across the roll face of the roll 1880. The third patterning roll 1880 is mated to the first patterning roll 1860, and the third patterning roll 1880 is registered to the first patterning roll 1860 in both the machine direction and the cross direction, to enable the incremental stretching of the first substrate 1810.

The fourth patterning roll 1890 includes protrusions 1891, and is configured in the same way as the third patterning roll 1880, except that the roll 1890 rotates 1890-*r* clockwise around an axis 1895. The fourth patterning roll 1890 is mated to the second patterning roll 1870, and the fourth patterning roll 1890 is registered to the second patterning roll 1870 in both the machine direction and the cross direction, to enable the incremental stretching of the second substrate 1820.

In various embodiments, the machine 1802 of FIG. 18 can be configured according to any alternative machine embodiments disclosed herein, in any workable combination.

Although the machine embodiments disclosed herein describe and illustrate solid state formation elements as rotating patterning rolls, in various embodiments, any such rolls may be replaced by one or more other kinds of solid state formation elements, such as planar patterning surfaces having similar protrusions, but which move into mating relationship and/or joining proximity with non-rotating movement (e.g. linear motion), as will be understood by one skilled in the art of solid state formation.

Figure 19:
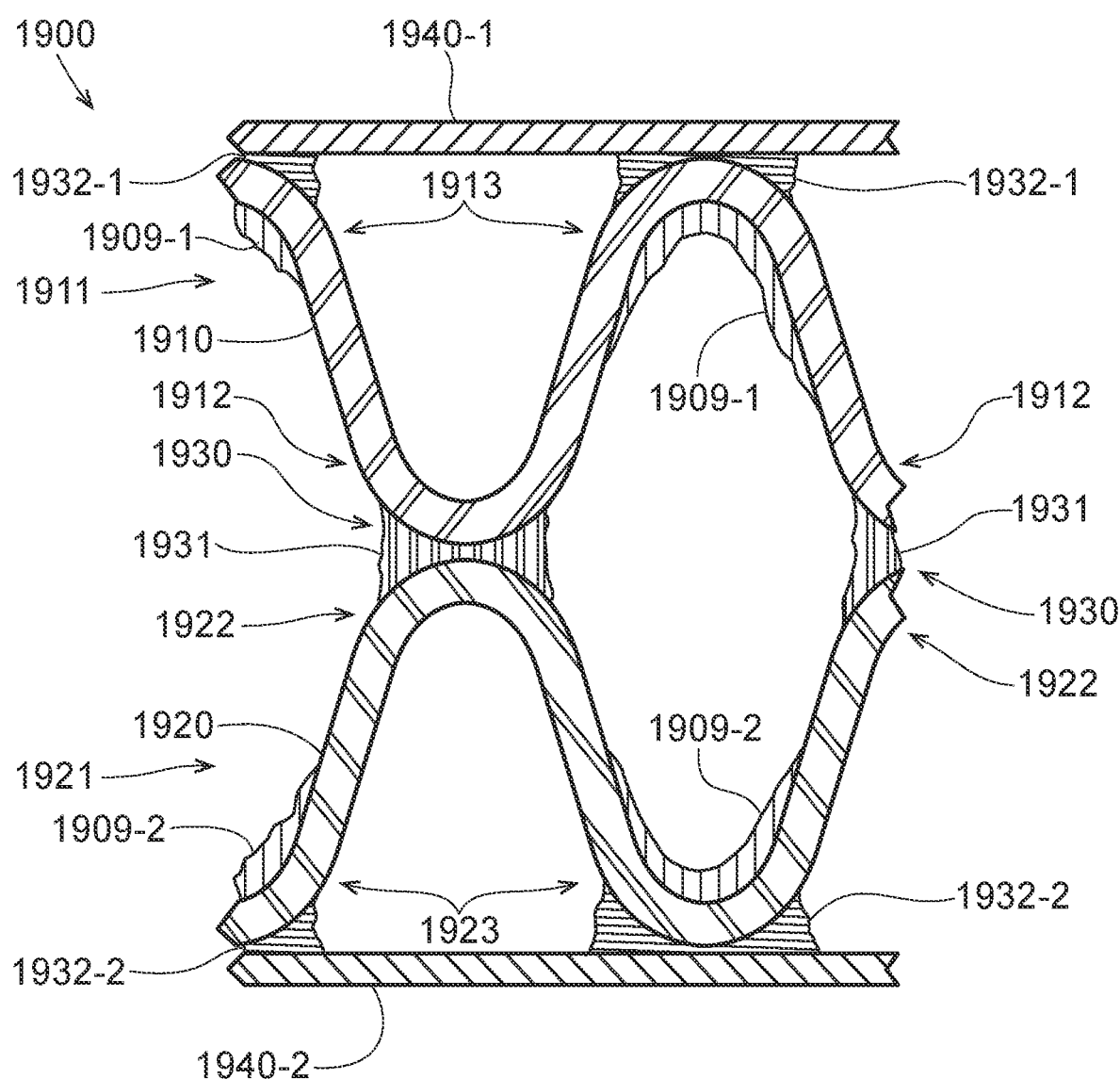
FIG. 19 is an enlarged cross-sectional view of a portion of a laminate with a patterned area formed by first and second films along with outer films, wherein the laminate includes benefit agents disposed at locations within the laminate.

FIG. 19 is an enlarged cross-sectional view of a portion of a laminate 1900 with a patterned area formed by a first substrate 1910 and a second substrate 1920 along with a first outer substrate 1940-1 and a second outer substrate 1940-2 wherein the laminate includes benefit agents disposed at locations within the laminate 1900. The portion of the laminate 1900 is configured in the same way as a corresponding portion from the laminate 500-*a* of FIG. 5A and is also configured in the same way as a corresponding portion from the laminate 700-*a* of FIG. 7A, with like-numbered elements in configured in the same way, except as described below.

The troughs 1912 of the corrugations 1911 from the first substrate 1910 are connected by an adhesive 1931 to the troughs 1922 of the corrugations 1921 from the second substrate 1920 at attachment areas 1930, and the adhesive 1931 includes one or more benefit agents, which can be any benefit agent disclosed herein or known in the art; for any laminate disclosed herein, any adhesive that connects the troughs of corrugations of first and second substrates, can include a benefit agent, which can be mixed into the adhesive and thus disposed on the laminate as part of the adhesive application process.

The inner portions of the crests 1913 of the corrugations 1911 from the first substrate 1910 include a benefit agent 1909-1 disposed on their surfaces, and the inner portions of the crests 1923 of the corrugations 1921 from the second substrate 1920 include a benefit agent 1909-2 disposed on their surfaces; the benefit agents 1909-1 and 1909-2 can be one or more of any benefit agent disclosed herein or known in the art, and may be applied directly or indirectly to the surfaces, in any convenient way (e.g. by spraying on) disclosed herein or known in the art.

The outer portions of the crests 1913 of the corrugations 1911 from the first substrate 1910 are connected by an adhesive 1932-1 at a plurality of locations to an inner side of the first outer substrate 1940-1 and the outer portions of the crests 1923 of the corrugations 1921 from the second substrate 1920 are connected by an adhesive 1932-2 at a plurality of locations to an inner side of the second outer substrate 1940-2, wherein the adhesive 1932-1 and the adhesive 1932-2 each include one or more benefit agents, which can be any benefit agent disclosed herein or known in the art; for any laminate disclosed herein having an outer substrate, any adhesive that connects the crests of corrugations of a substrate to an outer substrate, can include a benefit agent, which can be mixed into the adhesive and thus disposed on the laminate as part of the adhesive application process.

In various alternative, embodiments, the presence of some or all of the benefit agents disposed in the portion of the laminate 1900 may be omitted; the presence or absence of benefit agents may be repeated across part, parts, or all of a laminate.

FIG. 20A is an enlarged end view of a portion of an exemplary laminate 2010-a of the present disclosure, which illustrates the extent of a crest 2013 in a corrugation of a substrate of the laminate 2010-a. The crest 2013 is an outward facing portion of the wave-like corrugation with a convex shaped surface that is oriented outward, away from the interior of the laminate and its central plane 2007-a. The crest 2013 refers to the continuous section of that outward facing portion wherein reference lines (shown as phantom lines) drawn perpendicular to the substrate form inside angles of 45-90 degrees, with respect to the central plane 2007-a of the laminate 2010-a.

FIG. 20B is an enlarged end view of a portion of an exemplary laminate 2010-b of the present disclosure, which illustrates the extent of a trough 2012 in a corrugation of a substrate of the laminate 2010-b. The trough 2012 is an inward facing portion of the wave-like corrugation with a convex shaped surface that is oriented inward, toward the interior of the laminate and its central plane 2007-b. The trough 2012 refers to the continuous section of that inward facing portion wherein reference lines (shown as phantom lines) drawn perpendicular to the substrate form inside angles of 45-90 degrees, with respect to the central plane 2007-b of the laminate 2010-b.

Figure 21:
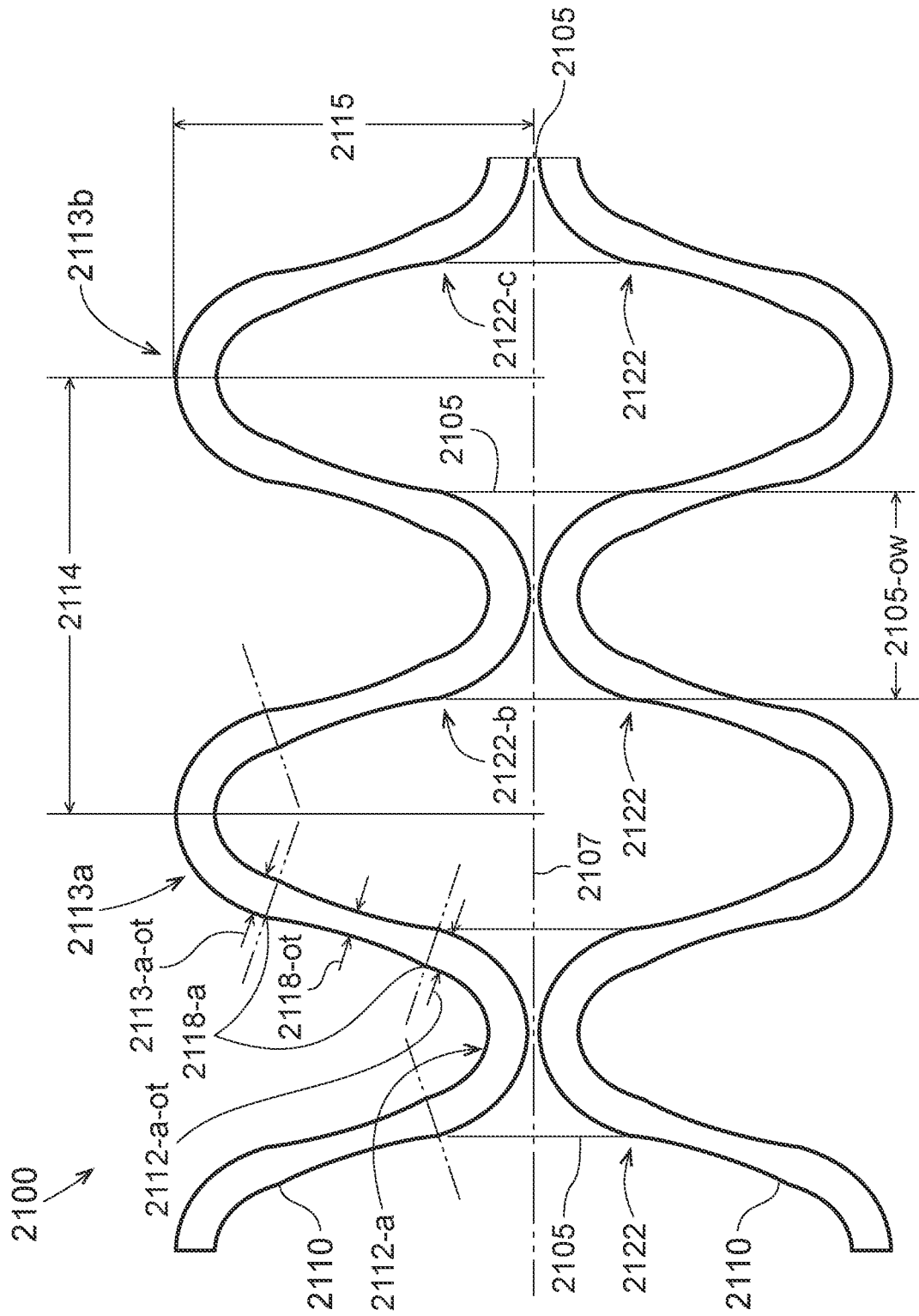
FIG. 21 is an enlarged end view of a portion of an exemplary laminate, which illustrates various measurements.

FIG. 21 is an enlarged end view of a portion of an exemplary laminate 2100 of the present disclosure formed by a first substrate 2110 and a second substrate 2120. The portion of the laminate 2100 is configured in the same way as a corresponding portion from the laminate 400-a of FIG. 4A and is also configured in the same way as a corresponding portion from the laminate 600-a of FIG. 6A, with like-numbered elements in configured in the same way, unless otherwise described below. FIG. 21 is intended to illustrate measurements for wavelength and amplitude, for all embodiments of laminates described herein. The laminate 2100 includes a central plane 2107, for reference, which is disposed throughout the middle of the laminate 2100; since the first substrate 2110 and the second substrate 2120 are symmetrical in the laminate 2100, the central plane 2107 is disposed between the troughs of the substrates.

The first substrate 2110 includes a first inward facing trough 2112-a, and a first outward facing crest 2113-a, which is the crest that is adjacent to the first trough 2112-a; the first trough 2112-a and the first crest 2113-a are integrally connected to opposite ends of a first intermediate portion 2118-a, which is the substantially straight portion of the first substrate 2110 in between the first trough 2112-a and the first crest 2113-a. The first trough 2112-a includes a smallest thickness 2112-a-ot, which is measured linearly, perpendicular to the first substrate 2110, at a location on the first trough 2112-a where that measurement is the smallest; a smallest thickness of a trough may usually be found at or near its farthest extent, proximate to an adjacent intermediate portion, although this is not required. The first crest 2113-a includes a smallest thickness 2113-a-ot, which is measured linearly perpendicular to the first substrate 2110, at a location on the first crest 2113-a where that measurement is the smallest; a smallest thickness of a crest may usually be found at or near its farthest extent, proximate to an adjacent intermediate portion, although this is not required. The first intermediate portion 2118-a includes a first intermediate smallest thickness 2118-a-ot, which is measured linearly, perpendicular to the first substrate 2110, at a location on the first intermediate portion where that measurement is the smallest; a smallest thickness of an intermediate portion may usually be found at or near its middle, although this is not required. The first intermediate smallest thickness 2118-a-ot is less than the first trough smallest thickness 2112-a-ot and the first intermediate smallest thickness 2118-a-ot is also less than the first crest smallest thickness 2113-a-ot; these differential relationships in thickness result from localized variable thinning of the first substrate 2110 during its incremental stretching, wherein the first substrate 2110 thins out the most in the first intermediate portion, which is the least constrained portion of the substrate material as it is stretched. The relationships and thicknesses of the first trough 2112-a, the first intermediate portion 2118-a, and the first crest 2113-a are repeated for the same adjacent elements in the first substrate 2110 and are also present for corresponding adjacent elements in the second substrate 2120.

The first substrate 2110 includes a second crest 2113-b, which is the crest that is adjacent to the first crest 2113-a. The overall distance between the center of the first crest 2113-a and the center of the second crest 2113-b is wavelength 2114, which is measured linearly, parallel to the central plane 2107 of the laminate 2100, and perpendicular to the overall orientations of the crests used for the measurement, as described and illustrated in connection with FIG. 21; a wavelength between any adjacent crests can be measured in this way for any laminate disclosed herein. The overall height of the second crest 2113-b is amplitude 2115, which is measured linearly from and perpendicular to the central plane 2107 of the laminate 2100 to an outer portion of the second crest 2113-b that is farthest away from the 2107 central plane; an amplitude of any crest can be measured in this way for any laminate disclosed herein.

The troughs 2112-a, 2112-b, and 2112-c of the first substrate 2110 are attached to the troughs 2122 of the second substrate 2120 by a plurality of attachment areas 2105, each of which has an overall width 2105-ow, which is the overall distance between farthest apart portions of the attachment area, measured linearly, parallel to the central plane 2107 of the laminate 2100, and perpendicular to the overall orientations of the troughs being attached by the attachment area; an overall width of any attachment area can be measured in this way for any laminate disclosed herein.

Figures 22, 23:
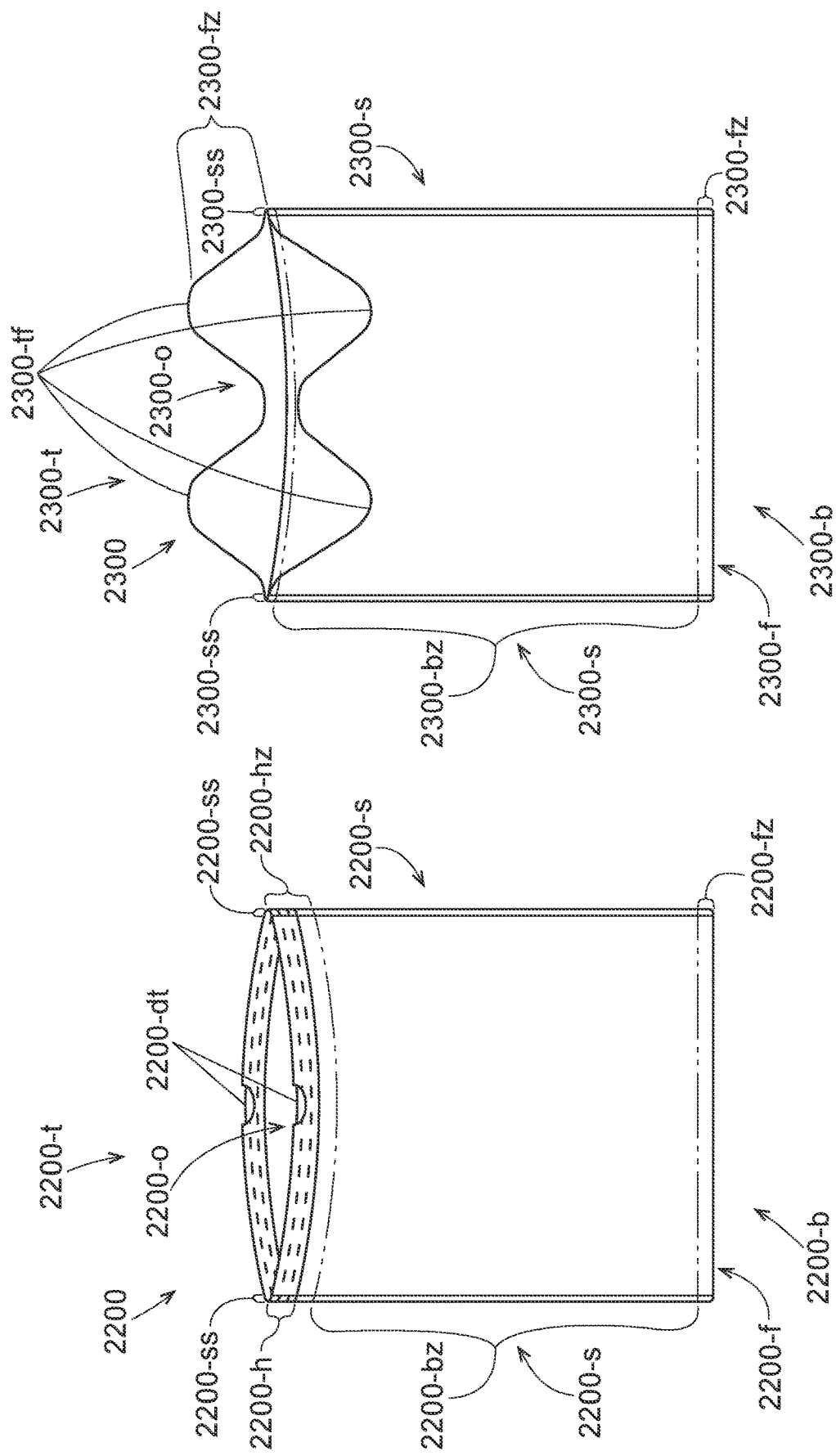
FIG. 22 is an exemplary drawstring type trash bag, which can include tip-bonded laminates of the present disclosure.
FIG. 23 is an exemplary tie type trash bag, which can include tip-bonded laminates of the present disclosure.

FIG. 22 is an exemplary drawstring type trash bag 2200, made of one or more films, the bag 2200 having a top 2200-t, a bottom 2200-b, and sides 2200-s. The bottom 2200-b is closed with a fold 2200-f; the sides are sealed with side seals 2200-ss, and the top 2200-t includes an opening 2200-o. At the top 2200-t, the bag 2200 includes a draw tape 2200-dt disposed within a hem 2200-h of folded bag material sealed to itself. A fold zone 2200-fz in a bottom portion of the bag 2200 includes the fold 2200-f and a portion of the bag 2200 adjacent to the fold 2200-f. A hem zone 2200-hz in a top portion of the bag 2200 includes the hem 2200-h and a portion of the bag 2200 adjacent to the hem 2200-h. A body zone 2200-bz of the bag 2200 extends all across the bag, between the top of the fold zone 2200-fz and the bottom of the hem zone 2200-hz.

Part, parts, or all of the bag 2200 and its draw tape 2200-dt can be configured to be formed of tip-bonded laminates according to one or more of any of the embodiments of the present disclosure, which may also be configured with one or more of any of the patterned areas of the present disclosure, in any workable combination, disclosed herein or known in the art. In particular, part, parts, or all of the top 2200-t, part, parts, or all of the bottom 2200-b, part, parts, or all of either or both sides 2200-s, part, parts, or all of the fold 2200-*f*, part, parts, or all of the fold zone 2200-*fz*, part, parts, or all of the draw tape 2200-*dt*, part, parts, or all of the hem 2200-*h*, part, parts, or all of the hem zone 2200-*hz*, and/or part, parts, or all of the body zone 2200-*bz*, individually, or in any combination, can be configured as a tip-bonded laminate, which may include one or more patterned areas formed from a tip-bonded laminate.

The drawstring type trash bag 2200 can be made from any kind of one or more films including materials disclosed herein or known in the art; the bag 2200 can be made using any process and equipment for making drawstring type trash bags, known in the art; the bag 2200 can be further configured and/or modified according any embodiments known in the art of disposable bags.

FIG. 23 is an exemplary tie type trash bag 2300, made of one or more films, the bag 2300 having a top 2300-*t*, a bottom 2300-*b*, and sides 2300-*s*. The bottom 2300-*b* is closed with a fold 2300-*f*, the sides are sealed with side seals 2300-*ss*, and the top 2300-*t* includes an opening 2300-*o*. At the top 2300-*t*, the bag 2300 includes tie flaps 2300-*tf* (on the front, shown folded down; on the back, shown upright) disposed as shaped integral parts of the bag material. A fold zone 2300-*fz* in a bottom portion of the bag 2300 includes the fold 2300-*f* and a portion of the bag 2300 adjacent to the fold 2300-*f*. A flap zone 2300-*fz* in a top portion of the bag 2300 includes the tie flaps 2300-*tf* and a portion of the bag 2300 adjacent to the tie flaps 2300-*tf*. A body zone 2300-*bz* of the bag 2300 extends all across the bag, between the top of the fold zone 2300-*fz* and the bottom of the flap zone 2300-*fz*.

Part, parts, or all of the bag 2300 can be configured to be formed of tip-bonded laminates according to one or more of any of the embodiments of the present disclosure, which may also be configured with one or more of any of the patterned areas of the present disclosure, in any workable combination, disclosed herein or known in the art. In particular, part, parts, or all of the top 2300-*t*, part, parts, or all of the bottom 2300-*b*, part, parts, or all of either or both sides 2300-*s*, part, parts, or all of the fold 2300-*f*, part, parts, or all of the fold zone 2300-*fz*, part, parts, or all of one, or some, or all of the tie flaps 2300-*tf*, part, parts, or all of the flap zone 2300-*fz*, and/or part, parts, or all of the body zone 2300-*bz*, individually, or in any combination, can be configured as a tip-bonded laminate, which may include one or more patterned areas formed from a tip-bonded laminate.

The tie type trash bag 2300 can be made from any kind of film including materials disclosed herein or known in the art; the bag 2300 can be made using any process and equipment for making tie type trash bags, known in the art; the bag 2300 can be further configured and/or modified according any embodiments known in the art of disposable bags.

In addition to drawstring type and tie type trash bags, tip-bonded laminates of the present disclosure can be similarly applied to part, parts, or all of film-based materials, components, and/or articles, including: any kind of bag (e.g. other kinds of trash bags, food storage bags, grocery bags, etc.); as a packaging and/or component material for any kind of film used with disposable wearable absorbent articles (e.g. feminine hygiene products, baby diapers, adult incontinence products, sanitary napkins, etc.), bandages, consumer products, other kinds of products, etc.

Tip bonded formed laminates of the present disclosure can be made from multiple layers of formed substrates, and can offer significant improvements over unformed, single layer substrates, including: greater resistance to bending, improved resilience to compression, directionally oriented responses to tensile loads, better aesthetics, enhanced structural properties, thicker portions, and designed patterns, without relying on more expensive polymers and/or high concentrations of substrate additives; as a result, such tip bonded formed laminates offer significant improvements at a reasonable cost, when compared with unformed, single layer substrates.

Test Method to Determine Localized Film Thickness

A Hitachi S-3500N Scanning Election Microscope (Tokyo, Japan) is the imaging device used to quantify the thickness of a film at specific locations on a 3D substrate.

Sample Preparation

A 2 cm×2 cm square is cut from the article. The 2 cm×2 cm square cut out is placed in 1 liter of liquid nitrogen for 5 minutes. Immediately after removing the 2 cm×2 cm square cut out from the liquid nitrogen, a 5 mm×5 mm square is cut from within the 2 cm×2 cm square with a new razor blade to create a cross-sectioned edge. The 5 mm×5 mm specimen has no holes, wrinkles, or gels. Five separate 5 mm×5 mm specimens are created by the same procedure. The 5 mm×5 mm samples are held for 24 hours at 24° C.+/−3° C. prior to imaging.

The cross-sectioned specimen is removed from liquid nitrogen with tweezers and mounted, cut surface up, onto an aluminum pin mount (e.g., Ted Pella #16111) using adhesive tabs (e.g., Ted Pella #16084-1). The mounted specimen is sputter-coated with gold to ensure no charging on the surface during subsequent scanning electron microscopy. Three minutes of sputter-coating at 45 mA is usually sufficient; if charging occurs, however, the specimen should be coated longer.

Imaging

The pin mount containing the coated specimen is fixed to an adapter (e.g., Ted Pella #15387-2) and inserted into the chamber of the Hitachi S-3500N SEM. The cross-sectioned surface is imaged under high vacuum with a voltage of 5 kV and a working distance of 11 mm to a magnification of 800× results in an image that is 2560×1920 pixels (160 μm×120 μm), for a resolution of 16 pixels per micron in both X and Y. Images of the directly adjacent crest, span and intermediate portion for comparison relative to the present invention are captured.

Image Analysis

The captured image is opened in Quartz PCI 7 Image Software (Quartz Imaging Corporation, Vancouver, CAN). Prior to measurement, the software is calibrated by drawing a straight line across the length of the scale bar stored in the image and entering in the known length of that bar (e.g., 50 μm). Afterwards, a perpendicular line is drawn across the cut surface of the imaged specimen, and thickness measurements in the desired portion are calculated using the software. The imaging procedure is repeated 5 times for each of the prepared 5 mm×5 mm specimens. The thickness measurements are reported to the nearest 0.1 micron.

Definitions

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, the term "amplitude" refers to the overall height of a crest in a laminate, wherein the overall height is measured linearly from and perpendicular to a central plane of the laminate to an outer portion of the crest that is farthest away from the central plane, as described and illustrated in connection with FIG. 21.

As used herein, when the term "approximately" modifies a particular value, the term refers to a range equal to the particular value, plus or minus fifteen percent (+/−15%). For any of the embodiments disclosed herein, any disclosure of a particular value, can, in various alternate embodiments, also be understood as a disclosure of a range equal to approximately that particular value (i.e. +/−15%).

As used herein, the term "benefit agent" refers to a chemistry (in solid or liquid form) that is disposed in or on the structure of a material in order for the chemistry to deliver one or more distinct functions, such as consumer noticeable effects; examples of benefit agents include: abrasives, absorbents, activators, additives, antibacterials, antifungals, antimicrobials, antioxidants, attractants, bleaches, brighteners, carriers, catalysts, chelators, cleaning agents, colorants, conditioners, desiccants, detergents, diluents, dispersants, dyes, enzymes, exfoliants, fertilizers, flavors or flavonoids, foaming agents, fragrances, herbicides, humectants, inhibiters, minerals, modifiers, moisturizers, moldicides, nutraceuticals, odor absorbent, oils, oxidizers, perfumes, pesticides, pharmaceuticals, phase change materials, pigments, plasticizers, preservatives, processing aids, purifiers, rinses, scavengers, scrubbers, sensates, sequestrants, shampoos, silicones, softeners, solvents, stabilizers, surfactants, thickeners, treatments, vitamins, waxes, and any other kind of benefit agent known in the art, in any workable combination.

As used herein, the term "crest" refers to a particular outward facing portion of a wave-like corrugation in a substrate of a tip-bonded formed laminate of the present disclosure, as described below and as further described and illustrated in connection with FIG. 20A. The crest is outward facing in that its convex shaped surface is oriented outward, away from the interior of the laminate. The crest refers to the continuous section of that outward facing portion of the corrugation wherein reference lines drawn perpendicular to the substrate form inside angles (illustrated in FIG. 20A) of 45-90 degrees, with respect to a central plane of the laminate.

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with differing leading digit(s), wherein that leading digit(s) matches the number for its Figure; as an example, an element of FIG. 3 labeled 320 and an element of FIG. 4 labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-*a* and a second embodiment of an element in FIG. 3B labeled 320-*b*, are like numbered.

As used herein, when the term "nearly" modifies a particular value, the term refers to a range equal to the particular value, plus or minus five percent (+/−5%). For any of the embodiments disclosed herein, any disclosure of a particular value, can, in various alternate embodiments, also be understood as a disclosure of a range equal to approximately that particular value (i.e. +/−5%).

As used herein, the term "overall width of an attachment area" refers to the overall distance between farthest apart portions of the attachment area, wherein the overall width is measured linearly, parallel to a central plane of the laminate and perpendicular to the overall orientations of the troughs being attached by the attachment area, as described and illustrated in connection with FIG. 21. For an attachment area formed by adhering, the overall width is the measured width of the attaching adhesive. For an attachment area formed by fusing, the overall width is the measured width of the fused portions.

As used herein, the term "solid state formation" refers to a process or equipment in which a mechanical force is exerted upon a substrate (e.g. film), which is in a solid state, wherein the force is applied by one or more rigid protrusions, which contact and permanently deform portions of the substrate by incremental stretching. Examples of solid state formation equipment include patterning rolls, patterning plates, and/or patterning belts with discrete and/or continuous rigid protrusions for engaging with and deforming one or more substrates of material, wherein the protrusions may be of any kind known in the art (e.g. fins, ridges, rings, rods, teeth, etc.), having any convenient size and proportions (e.g. uniform height, variable heights, etc.), and any overall shape known in the art (e.g. conical, cuboid, cylindrical, prismatic, pyramidal, etc.), along with any particular tip shape (e.g. flat, pointed, rounded, sharp, etc.), wherein the protrusions extend out from a base over part, parts, or all of the patterning roll/plate/belt. In particular, it contemplates that any of the patterning rolls disclosed herein can be replaced by a patterning roll or patterning belt, as known in the art of solid state formation. Notably, solid state formation of a film based substrate differs from other substrate formation processes such as molding (where substrates are shaped while in a semi-molten or molten state), wet-laid processes (where a wet substrate of fibers is shaped before being dried), and embossing (where a pattern of low-strain deformations is made in a substrate by using a patterning roll to press the substrate against a flat or deformable roll).

Any embodiment of substrate made of films, as described herein, can be made using various solid state formation processes known in the art, including any processes applicable to films, which are disclosed in any of the following, each of which is incorporated by reference:

As used herein, when the term "substantially" modifies a particular value, the term refers to a range equal to the particular value, plus or minus ten percent (+/−10%). For any of the embodiments disclosed herein, any disclosure of a particular value, can, in various alternate embodiments, also be understood as a disclosure of a range equal to approximately that particular value (i.e. +/−10%).

As used herein, the term "trough" refers to a particular inward facing portion of a wave-like corrugation in a substrate of a tip-bonded formed laminate of the present disclosure, as described below and as further described and illustrated in connection with FIG. 20B. The trough is inward facing in that its convex shaped surface is oriented inward, toward the interior of the laminate. The trough refers to the continuous section of that inward facing portion of the corrugation wherein reference lines drawn perpendicular to the substrate form inside angles of 45-90 degrees (as illustrated in FIG. 20B), with respect to a central plane of the laminate.

As used herein, the term "wavelength" refers to the overall distance between the centers of adjacent crests in a laminate, wherein the wavelength is measured linearly, parallel to a central plane of the laminate, and perpendicular to the overall orientations of the crests used for the measurement as described and illustrated in connection with FIG. 21.

EXAMPLES/COMBINATIONS—LAMINATES

A1. A laminate comprising:
 a first film having a first plurality of integrally connected, incrementally stretched, elongated corrugations disposed side-by-side, each having:
  a first inward facing trough, which has a first trough smallest thickness;
  a first outward facing crest, which has a first crest smallest thickness; and
  a first intermediate portion disposed between the first trough and the first crest, wherein the first intermediate portion has a first intermediate smallest thickness, which is less than the first crest smallest thickness;
 a second film having a second plurality of integrally connected, incrementally stretched, elongated corrugations disposed side-by-side, each having:
  a second inward facing trough, which has a second trough smallest thickness;
  a second outward facing crest, which has a second crest smallest thickness; and
  a second intermediate portion disposed between the second trough and the second crest, wherein the second intermediate portion has a second intermediate thickness, which is less than the second crest smallest thickness;
 a plurality of attachment areas, wherein each of the attachment areas is directly connected to a trough of a corrugation from the first plurality to a trough of a corrugation from the second plurality.

A2. The laminate of paragraph A1, wherein the first intermediate smallest thickness is less than the first trough smallest thickness, and the second intermediate smallest thickness is less than the second trough smallest thickness.

A3. The laminate of paragraph A2, wherein each of the corrugations from the first plurality is directly connected to only one of the corrugations from the second plurality.

A4. The laminate of paragraph A3, wherein each of the corrugations from the second plurality is directly connected to only one of the corrugations from the first plurality.

A5. The laminate of any one of paragraphs A1 to A4, wherein:
 the corrugations of the first plurality are discrete corrugations; and
 the corrugations of the second plurality are discrete corrugations.

A6. The laminate of any one of paragraphs A1 to A4, wherein:
 the corrugations of the first plurality are discrete corrugations; and
 the corrugations of the second plurality are continuous corrugations.

A7. The laminate of any one of paragraphs A1 to A4, wherein:
 the corrugations of the first plurality are continuous corrugations; and
 the corrugations of the second plurality are continuous corrugations.

A8. The laminate of any one of paragraphs A1-A7, wherein the first plurality is only connected to the second plurality by the plurality of attachment areas.

A9. The laminate of any one of paragraphs A1-A8, wherein each of the attachment areas is substantially continuous along a trough of a corrugation from the first plurality.

A10. The laminate of paragraph A9, wherein each of the attachment areas is substantially continuous along a trough of a corrugation from the second plurality.

A11. The laminate of any one of paragraphs A1 to A10, wherein:
 the first plurality connects to a first uncorrugated portion of the first film at a first transition;
 the second plurality connects to a second uncorrugated portion of the second film at a second transition that is offset from the first transition.

A12. The laminate of any one of paragraphs A1 to A10, wherein:
 the first plurality connects to a first uncorrugated portion of the first film at a first transition;
 the second plurality connects to a second uncorrugated portion of the second film at a second transition that is adjacent to the first transition.

A13. The laminate of any one of paragraphs A1-A12, wherein for at least some of the corrugations of the first plurality, a ratio of an amplitude of the corrugation to a wavelength of the corrugation is from 0.7 to 5.

A14. The laminate of paragraph A13, wherein for substantially all of the corrugations of the first plurality, the ratio of the amplitude to the wavelength is from 1 to 3.

A15. The laminate of any one of paragraphs A13 or A14, wherein for at least some of the corrugations of the first plurality, the amplitude is from 1 to 10 millimeters.

A16. The laminate of paragraph A15, wherein for substantially all of the corrugations of the first plurality, the amplitude is from 1 to 4 millimeters.

A17. The laminate of any one of paragraphs A13 to A16, wherein for at least some of the corrugations of the first plurality, preferably for all of the corrugations, a ratio of the wavelength to an overall width of an attachment area for the corrugation is from 10 to 50, preferably from 25 to 50.

A18. The laminate of paragraph A17, wherein for at least some of the corrugations of the first plurality, the overall width of the attachment area is from 0.2 to 1 millimeters.

A19. A disposable wearable absorbent article comprising the laminate of any one of paragraphs A1-A18.

A20. A disposable bag comprising the laminate of any one of paragraphs A1 to A18.

EXAMPLES/COMBINATIONS—MACHINES FOR FORMING LAMINATES

C1. A machine for forming a laminate, the machine comprising:
 a machine direction and a cross direction;
 a first web supply apparatus and a second web supply apparatus, which are the only web supply apparatus of the machine;
 a first rotating patterning roll, which is downstream from the first web supply apparatus and having a first plurality of rigid, elongated protrusions, each with a tip; and
 a second rotating patterning roll, which is downstream from the first web supply apparatus and having a second plurality of rigid, elongated protrusions, each with a tip;

wherein the first roll is positioned with respect to the second roll such that, as the rolls rotate:
the tips of the first plurality are always unmated with the tips of the second plurality;
the tips of the first plurality come within joining proximity of the tips of the second plurality, wherein the joining proximity is 0-5 millimeters.

C2. The machine of paragraph C1, wherein: each protrusion of the first plurality is a discrete protrusion; and each protrusion of the second plurality is a discrete protrusion.

C3. The machine of paragraph C2, wherein each of the patterning rolls is a solid state formation roll with discrete protrusions.

C4. The machine of paragraph C1, wherein: each protrusion of the first plurality is a discrete protrusion; and each protrusion of the second plurality is a continuous protrusion.

C5. The machine of paragraph C1, wherein: each protrusion of the first plurality is a continuous protrusion; and each protrusion of the second plurality is a continuous protrusion.

C6. The machine of paragraph C1, wherein each of the patterning rolls is a ring-roll.

C7. The machine of any one of paragraphs C2, C4, or C5, wherein: each protrusion of the first plurality is oriented lengthwise in the cross direction; and each protrusion of the second plurality is oriented lengthwise in the cross direction.

C8. The machine of any one of paragraphs C2, C5, or C6, wherein: each protrusion of the first plurality is oriented lengthwise in the machine direction; and each protrusion of the second plurality is oriented lengthwise in the machine direction.

C9. The machine of any one of paragraphs C1-C8, wherein the first roll is registered with the second roll such that each of the tips of the first plurality is aligned with one tip from the second plurality.

C10. The machine of any one of paragraphs C2, C4, or C5, wherein: each protrusion of the first plurality is oriented lengthwise in the cross direction; and each protrusion of the second plurality is oriented lengthwise in the machine direction.

C11. The machine of any one of paragraphs C2, C4, or C5, wherein:
each protrusion of the first plurality is oriented lengthwise at a first angle from 1-89° with respect to the machine direction;
each protrusion of the second plurality is oriented lengthwise at a second angle between with respect to the machine direction, wherein the second angle is about equal to and opposite from the first angle.

C12. The machine of any one of paragraphs C1-C11, wherein the first roll is registered with the second roll such that as the rolls rotate, the first plurality at least partially aligns with the second plurality.

C13. The machine of any one of paragraphs C1-C12, wherein the first roll is registered with the second roll in the machine direction.

C14. The machine of any one of paragraphs C1-C13, including a third patterning roll that is mated with the first patterning roll and is downstream from the first web supply apparatus.

C15. The machine of any one of paragraphs C1-C14, including a fourth patterning roll that is mated with the second patterning roll and is downstream from the second web supply apparatus.

C16. The machine of any one of paragraphs C1-C15, including a first adhesive application apparatus that applies adhesive to a film engaged with the first patterning roll.

C17. The machine of any one of paragraphs C1-C16, including a force application apparatus that moves the first roll toward the second roll.

C18. The machine of any one of paragraphs C1-C17, wherein the joining proximity is 0-0.5 millimeters.

C19. The machine of any one of paragraphs C1-C18, wherein the joining proximity is 0-0.1 millimeters.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of forming a laminate, the method comprising:
incrementally mechanically stretching a first film by engaging at least a first portion of the first film with at least a first plurality of protrusions to form within the first portion a first plurality of integrally connected, elongated corrugations disposed side-by-side, each having a trough and a crest;
incrementally mechanically stretching a second film by engaging at least a second portion of the second film with at least a second plurality of protrusions to form within the second portion a second plurality of integrally connected, elongated corrugations disposed side-by-side, each having a trough and a crest; and
while the portion of the first film is engaged with the first plurality of protrusions, and while the portion of the second film is engaged with the second plurality of protrusions, directly connecting the first plurality of corrugations to the second plurality of corrugations at a plurality of attachment areas, to form the laminate.

2. The method of claim 1, wherein the stretching of the first film comprises forming the first plurality of corrugations, which are discrete corrugations.

3. The method of claim 1, wherein the stretching of the second film comprises forming the second plurality of corrugations, which are discrete corrugations.

4. The method of claim 1, wherein the connecting comprises directly connecting the first plurality to the second plurality at the plurality of attachment areas, such that each trough of a corrugation from the first plurality is directly connected to a single trough of a corrugation from the second plurality.

5. The method of claim 1, wherein the connecting comprises directly connecting the first plurality to the second plurality only at the plurality of attachment areas.

6. The method of claim 1, wherein the connecting comprises directly connecting the first plurality to the second plurality such that each of attachment areas is substantially continuous along at least one of the troughs.

7. The method of claim 1, wherein the first plurality of protrusions are parallel with each other, such that the stretching of the first film forms the first plurality of corrugations, which are parallel with each other.

8. The method of claim 7, wherein, during the connecting, the first plurality of corrugations are parallel with the second plurality of corrugations.

9. The method of claim 1, comprising, before the connecting, registering the first plurality of corrugations with the second plurality of corrugations in a cross direction.

10. The method of claim 1, comprising, before the connecting, registering the first plurality of corrugations with the second plurality of corrugations in a machine direction.

11. The method of claim 1, wherein the connecting comprises adhering the troughs of the corrugations from the first plurality to the troughs of the corrugations from the second plurality.

12. The method of claim 1, comprising applying adhesive to the first film only on troughs of corrugations of the first film.

13. The method of claim 1, wherein the connecting comprises fusing the troughs of the corrugations from the first plurality to the troughs of the corrugations from the second plurality.

14. The method of claim 1, wherein the stretching of the first film comprises stretching with the first plurality of protrusions, which are disposed on a first base adjacent to a portion of the first base that is free of protrusions, such that the laminate comprises a first uncorrugated portion adjacent to at least a side of the plurality of attachment areas.

15. The method of claim 14, wherein the second uncorrugated portion surrounds the plurality of attachment areas.

16. The method of claim 14, wherein the stretching of the second film comprises stretching with the second plurality of protrusions, which are disposed on a second base adjacent to a portion of the second base that is free of protrusions, such that the laminate comprises a second uncorrugated portion adjacent to at least the side of the plurality of attachment areas.

17. The method of claim 16, wherein the second uncorrugated portion is independent from the first uncorrugated portion.

18. The method of claim 16, wherein the second uncorrugated portion is offset from the first uncorrugated portion.

19. The method of claim 1, comprising joining a first outer film to at least some crests of the corrugations from the first plurality.

20. The method of claim 1, comprising joining a second outer film to at least some crests of the corrugations from the second plurality.

\* \* \* \* \*